United States Patent
Suzuki

(10) Patent No.: US 10,338,858 B2
(45) Date of Patent: Jul. 2, 2019

(54) NON-TRANSITORY RECORDING MEDIUM STORING SCANNER PROFILE CORRECTING PROGRAM, SCANNER PROFILE CORRECTING METHOD, AND PRINTER

(71) Applicant: KONICA MINOLTA, INC., Chiyoda-ku, Tokyo (JP)

(72) Inventor: Naoyo Suzuki, Tama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/921,366

(22) Filed: Mar. 14, 2018

(65) Prior Publication Data

US 2018/0285033 A1    Oct. 4, 2018

(30) Foreign Application Priority Data

Mar. 28, 2017   (JP) ................................ 2017-062598

(51) Int. Cl.
G06F 3/12      (2006.01)
H04N 1/60      (2006.01)
H04N 1/00      (2006.01)

(52) U.S. Cl.
CPC ....... *G06F 3/1208* (2013.01); *H04N 1/00023* (2013.01); *H04N 1/00087* (2013.01); *H04N 1/6044* (2013.01)

(58) Field of Classification Search
CPC .............. G06F 3/1208; H04N 1/00023; H04N 1/6044; H04N 1/00087
See application file for complete search history.

(56) References Cited

U.S. PATENT DOCUMENTS

| | | | | |
|---|---|---|---|---|
| 2006/0285134 A1* | 12/2006 | Viturro | .................. | G03G 15/01 358/1.9 |
| 2014/0293300 A1* | 10/2014 | Teraue | ................. | H04N 1/6036 358/1.9 |
| 2015/0350493 A1* | 12/2015 | Sakatani | .............. | H04N 1/6052 358/504 |
| 2015/0365564 A1* | 12/2015 | Imaseki | ............... | H04N 1/6019 358/504 |

FOREIGN PATENT DOCUMENTS

| | | |
|---|---|---|
| JP | 2006033572 A | 2/2006 |
| JP | 2008136065 A | 6/2008 |

* cited by examiner

*Primary Examiner* — Neil R McLean
(74) *Attorney, Agent, or Firm* — Holtz, Holtz & Volek PC

(57) ABSTRACT

Provided are a non-transitory recording medium, a scanner profile correcting method and a printer. A printer outputs a color chart including color patches for correcting a scanner profile. A hardware processor of the printer or a device in a printing system obtains measured RGB values and measured colorimetric values of the color patches. The hardware processor calculates, for each K component value, two kinds of correlation of each of R, G and B component values with lightness component values, by using a scanner profile, and the measured RGB values and colorimetric values. The hardware processor calculates, for each K component value, a difference in each of R, G and B components between RGB values given from the first correlations and the second correlations, both correlated with each of lightness component values, and creates correction tables for R, G and B components, to be used for correcting the scanner profile.

21 Claims, 17 Drawing Sheets

FIG. 12A

K VALUE  α=0%

| INPUT | | | OUTPUT | | |
|---|---|---|---|---|---|
| R | G | B | L* | a* | b* |
|  |  |  |  |  |  |
|  |  |  |  |  |  |
|  |  |  |  |  |  |
| ⋮ | ⋮ | ⋮ | ⋮ | ⋮ | ⋮ |
|  |  |  |  |  |  |

FIG. 12B

K VALUE  α=40%

| INPUT | | | OUTPUT | | |
|---|---|---|---|---|---|
| R | G | B | L* | a* | b* |
|  |  |  |  |  |  |
|  |  |  |  |  |  |
|  |  |  |  |  |  |
| ⋮ | ⋮ | ⋮ | ⋮ | ⋮ | ⋮ |
|  |  |  |  |  |  |

FIG. 12C

K VALUE  α=100%

| INPUT | | | OUTPUT | | |
|---|---|---|---|---|---|
| R | G | B | L* | a* | b* |
|  |  |  |  |  |  |
|  |  |  |  |  |  |
|  |  |  |  |  |  |
| ⋮ | ⋮ | ⋮ | ⋮ | ⋮ | ⋮ |
|  |  |  |  |  |  |

| K0 | K0-CMY0 | K0-CMY100 |
| K20 | K20-CMY0 | K20-CMY100 |
| K40 | K40-CMY0 | K40-CMY100 |
| K60 | K60-CMY0 | K60-CMY100 |
| K80 | K80-CMY0 | K80-CMY100 |
| K100 | K100-CMY0 | K1000-CMY100 |

NON-TRANSITORY RECORDING MEDIUM STORING SCANNER PROFILE CORRECTING PROGRAM, SCANNER PROFILE CORRECTING METHOD, AND PRINTER

Japanese Patent Application No. 2017-062598 filed on Mar. 28, 2017, including description, claims, drawings, and abstract, the entire disclosure of which is incorporated herein by reference in its entirety.

TECHNOLOGICAL FIELD

The present invention is directed to non-transitory recording media each storing a computer-readable program for correcting a scanner profile, scanner profile correcting methods and printers. In particular, the present invention is directed to non-transitory recording media each storing a scanner correcting program to create a correction table to be used for correcting a scanner profile, scanner profile correcting methods, and printers each equipped with an in-line scanner and an in-line color measurement device.

BACKGROUND

Devices such as a scanner and a printer output device values (like RGB values or CMYK values), which are values depending on the respective devices, or device-dependent values. To handle such device values, a color conversion table (a device profile) for converting device values into device-independent values is created, and color conversion (conversion between device values and device-independent values) is performed using the device profile. As an example of a way to create a device profile, a description is now given of a way to create a scanner profile. To create a scanner profile, a color chart is output with a printer, and the color chart is measured with a scanner and a color measurement device (like a colorimeter or a spectrophotometer), where the scanner obtains measured RGB values and the color measurement device obtains measured device-independent color values like L*a*b* values in the CIE 1976 color space or XYZ values of the CIE 1931 color space ("colorimetric values" is a general term for these values). The measured RGB values and the corresponding measured colorimetric values are associated with each other, whereby a scanner profile is created.

In executing color conversion of device values obtained by measurement of a printed matter with a scanner, by using a scanner profile created beforehand through the above-described procedures, a certain problem can arises. That is, an individual difference of a scanner used in the creation of the scanner profile and that used in color conversion (where the individual difference means a difference in characteristics among a same type of scanners which are different in lot) and a difference of print sheets in properties can cause deterioration in color accuracy of converted colors, even after color calibration has been executed in an assembly process of the printer, by using a reference color chart printed by offset printing. In such a case, it is necessary to correct the scanner profile.

As an example of a technique to correct a scanner profile, there is a technique to use a commercial software program, and recreate the scanner profile by measuring a color chart, which was reprinted with a printer, with both a scanner and a color measurement device. As an example of a technique to correct a scanner profile in response to an occurrence of deviation of scanner characteristics, Japanese Unexamined Patent Publication (JP-A) No. 2006-033572 discloses a technique to, when a need for color conversion arises because of deviation of scanner characteristics, cause a high-speed external device to perform calculation for a creation of a scanner profile, so as to reduce a load of an image processing apparatus.

As an example of a technique relating to correction of a device link profile, which is not a technique to correct a scanner profile, JP-A No. 2008-136065 discloses a technique to perform a color-tone correction on a device link profile which does not include device-independent profile data. The technique divides a device link profile into several parts according to K component values, to create three-dimensional parameters such that an output value is specified for each lattice point represented by input values for C, M, and Y components. From the three-dimensional parameters, the technique extracts at least one lattice point where any of C, M, and Y component values becomes 100%, as a target lattice point, and determines the range of full-saturated values (the range of tone-correction targets) in which output values are at full saturated. Then the technique adjusts the parameters at points needing adjustment, which are the lattice points in the determined range, so as not to give full-saturated tones.

To correct a scanner profile, the above-described technique using a commercial software program and the technique disclosed in JP-A No. 2006-033572 need a process to recreate a scanner profile from the beginning, and thus need sufficient time to correct the scanner profile. These techniques further need, at each time when a scanner profile is corrected, a process of outputting a color chart for creating a scanner profile, which may waste time and resources to print the color charts.

Moreover, the technique disclosed in JP-A No. 2008-136065 is a technique established under the assumption that input CMYK values are fixed. This technique is not suitable for correction of a scanner profile, because measurement of a color chart, which was printed by a printer having deviating characteristics, with a scanner and a color measurement device, gives deviating RGB values and deviating L*a*b* values.

SUMMARY

The present invention is directed to non-transitory recording media each storing a scanner profile correcting program, scanner profile correcting methods and printers, which allow a printer or a device in a printing system to correct a scanner profile easily in each printing process of a printer and further allow the printer or device to correct a scanner profile with high accuracy all over the color gamut of the scanner profile.

A non-transitory recording medium reflecting one aspect of the present invention stores a computer-readable program for correcting a scanner profile in a printing system, where the printing system includes a printer, a scanner, a color measurement device and a storage device. The program comprises instructions which, when executed by a hardware processor, cause the hardware processor to perform the following operations. The operations comprise obtaining measured RGB values of color patches given by measurement of the color patches with the scanner, and measured colorimetric values of the color patches given by measurement of the color patches with the color measurement device, where the color patches are those for correcting a scanner profile in a first color chart that was printed by the printer. The color patches include a first group of patches of colors in CMYK values such that K component values specified for the patches increase from 0% at certain intervals and C, M and Y component values specified for each of the patches are 0%, and a second group of patches of colors in CMYK values such that K component values specified for the patches are same as the K component values of the patches of the first group and C, M and Y component values specified for each of the patches are almost the same and greater than 0%. The operations further comprise calculating first correlations. This calculation includes obtaining from the storage device a scanner profile created by measurement of a second color chart for creating a scanner profile, obtaining K component values specified for patches in the second color chart, and using the scanner profile to calculate a correlation of each of R component values, G component values and B component values of RGB values in the scanner profile with lightness component values of corresponding colorimetric values in the scanner profile, for each of the K component values. The operations further comprise calculating second correlations. This calculation includes obtaining K component values specified for the color patches for correcting a scanner profile, and using the measured RGB values and the measured colorimetric values of the color patches for correcting a scanner profile, to calculate a correlation of each of R component values, G component values and B component values of the measured RGB values with lightness component values of the measured colorimetric values, for each of the K component values. The operations further comprise calculating, for each of K component values, a difference in each of R, G and B components between a RGB value given from the first correlations and a measured RGB value given from the second correlations, both correlated with each of lightness component values of colorimetric values, by using the first correlations and the second correlations. The operations further comprise using the difference in each of R, G and B components calculated for each of K component values, to create correction tables for R, G and B components, to be used for correcting the scanner profile.

A scanner profile correcting method reflecting one aspect of the present invention is a method of correcting a scanner profile in a printing system, where the printing system includes a printer, a scanner, a color measurement device, a storage device and a controller for controlling the printer, the scanner and the color measurement device. The method comprises printing, by the printer, a first color chart including color patches for correcting a scanner profile, where the color patches include a first group of patches of colors in CMYK values such that K component values specified for the patches increase from 0% at certain intervals and C, M and Y component values specified for each of the patches are 0%, and a second group of patches of colors in CMYK values such that K component values specified for the patches are same as the K component values of the patches of the first group and C, M and Y component values specified for each of the patches are almost same and greater than 0%. The method further comprises measuring, by the scanner, the color patches for correcting a scanner profile, to obtain measured RGB values of the color patches; and measuring, by the color measurement device, the color patches for correcting a scanner profile, to obtain measured colorimetric values of the color patches. The method further comprises calculating first correlations by the controller. The calculation includes obtaining from the storage device a scanner profile created by measurement of a second color chart for creating a scanner profile, obtaining K component values specified for patches in the second color chart, and using the scanner profile to calculate a correlation of each of R component values, G component values and B component values of RGB values in the scanner profile with lightness component values of corresponding colorimetric values in the scanner profile, for each of the K component values. The method further comprises calculating second correlations by the controller. The calculation includes obtaining K component values specified for the color patches for correcting a scanner profile, and using the measured RGB values and the measured colorimetric values of the color patches for correcting a scanner profile, to calculate a correlation of each of R component values, G component values and B component values of the measured RGB values with lightness component values of the measured colorimetric values, for each of the K component values. The method further comprises calculating, by the controller, for each of K component values, a difference in each of R, G and B components between a RGB value given from the first correlations and a measured RGB value given from the second correlations, both correlated with each of lightness component values of colorimetric values, by using the first correlations and the second correlations. The method further comprises using, by the controller, the difference in each of R, G and B components calculated for each of K component values, to create correction tables for R, G and B components, to be used for correcting the scanner profile.

A printer reflecting one aspect of the present invention is a printer comprising: a print engine; an in-line scanner; an in-line color measurement device; a storage unit; and a hardware processor that performs the following operations. The operations include causing the print engine to print a first color chart including color patches for correcting a scanner profile, where the color patches include a first group of patches of colors in CMYK values such that K component values specified for the patches increase from 0% at certain intervals and C, M and Y component values specified for each of the patches are 0%, and a second group of patches of colors in CMYK values such that K component values specified for the patches are same as the K component values of the patches of the first group and C, M and Y component values specified for each of the patches are almost same and greater than 0%. The operations further include causing the in-line scanner to measure the color patches for correcting a scanner profile, to obtain measured RGB values of the color patches, and causing the in-line color measurement device to measure the color patches for correcting a scanner profile, to obtain measured colorimetric values of the color patches. The operations further include calculating first correlations. The calculation includes obtaining from the storage unit a scanner profile created by measurement of a second color chart for creating a scanner profile, obtaining K component values specified for patches in the second color chart, and using the scanner profile to calculate a correlation of each of R component values, G component values and B component values of RGB values in the scanner profile with lightness component values of corresponding colorimetric values in the scanner profile, for each of the K component values. The operations further include calculating second correlations. The calculation includes obtaining K component values specified for the color patches for correcting a scanner profile, and using the measured RGB values and the measured colorimetric values of the color patches for correcting a scanner profile, to calculate a correlation of each of R component values, G component values and B component values of the measured RGB values with lightness component values of the measured colorimetric values, for each of the K component values. The operations further include calculating, for each of K component values, a difference in each of R, G and B components between a RGB value given from the first correlations and a measured RGB value given from the second correlations, both correlated with each of lightness component values of colorimetric values, by using the first correlations and the second correlations. The operations further include using the difference in each of R, G and B components calculated for each of K component values, to create correction tables for R, G and B components, to be used for correcting the scanner profile.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 12A to 12C are diagrams illustrating an example of a scanner profile (a color conversion table) according to one example of the present invention;

DETAILED DESCRIPTION OF EMBODIMENTS

Figure 1:
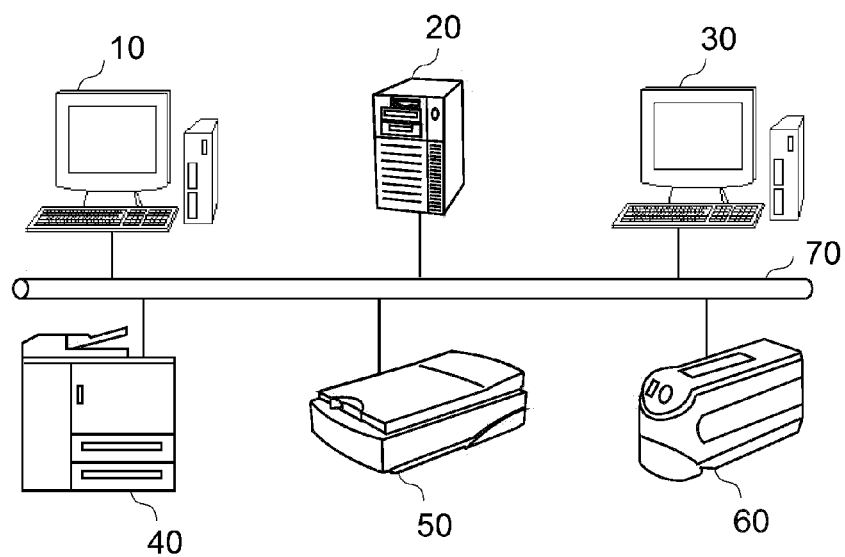
FIG. 1 is a schematic diagram illustrating an example of the constitution of a printing system according to one embodiment of the present invention.

Hereinafter, one or more embodiments of the present invention will be described with reference to the drawings. However, the scope of the invention is not limited to the illustrated embodiments.

As noted in the BACKGROUND, a scanner profile is created by measuring a color chart, which were output by a printer, with a scanner and a color measurement device, and associating measured RGB values obtained by the scanner with measured colorimetric values obtained by the color measurement device. In the scanner profile, a colorimetric value (a device-independent color value like a L*a*b* value or a XYZ value) is associated with a RGB value at each of lattice points arranged at fixed intervals. A use of conversion of device values into device-independent colors, allows a printer to output desired colors.

However, there are an individual difference between a scanner used in a process of creation of a scanner profile and a scanner used in a process of actual printing and a difference between print sheets used in the process of creation of a scanner profile and print sheets used in the process of actual printing. It can make a deviation of the correspondence between the RGB values and the colorimetric values. Such a deviation makes deterioration of the accuracy of colors output by the printer, which is unsatisfactory for a user who seeks high color accuracy. In particular, deterioration of color accuracy within the color gamut of the printer becomes problems.

In order to eliminate this deviation, a method of recreating the scanner profile may be considered. However, recreating a scanner profile from the beginning makes time necessary to correct the scanner profile longer. Further, outputting color chart for creating a scanner profile in order to correct a scanner profile, makes the waste of time and resource for correcting the scanner profile.

In view of that, there are provided the following printing system and correction of a scanner profile to be executed in the printing system, as an embodiment of the present invention. The printing system includes a printer, a scanner, a color measurement device, a storage device, and a controller (which can be a computing device like a profile creation device or a control unit in the printer) for controlling the printer, the scanner and the color measurement device. First, the printer prints out a first color chart including color patches for correcting a scanner profile (including a group of K-gray patches, which include a 0% K patch, and a group of CMYK-gray patches prepared by setting the C, M and Y component values specified for each K-gray patch at almost the same values being greater than 0%). Then, the scanner and the color measurement device measure the color patches for correcting a scanner profile in the first color chart printed, to obtain measured RGB values and measured colorimetric values of the color patches, respectively. Next, the controller obtains from the storage device a scanner profile created by measurement of a second color chart for creating a scanner profile beforehand. The controller then obtains K component values specified for patches in the second color chart, and uses the scanner profile to calculate first correlations, for each of the K component values. The first correlation is a correlation of each of R component values, G component values and B component values of RGB values in the scanner profile with lightness component values of corresponding colorimetric values in the scanner profile (for example, a correlation of R component values of the RGB values with L* component values of the corresponding colorimetric values, a correlation of G component values of the RGB values with L* component values of the corresponding colorimetric values, and a correlation of B component values of the RGB values with L* component values of the corresponding colorimetric values). The controller further obtains K component values specified for the color patches for correcting a scanner profile, and uses the measured RGB values and the measured colorimetric values of the color patches for correcting a scanner profile, to calculate second correlations, for each of the K component values. The second correlation is also a correlation of each of R component values, G component values and B component values of the measured RGB values with lightness component values of the measured colorimetric values (for example, a correlation of R component values of the measured RGB values with L* component values of the measured colorimetric values, a correlation of G component values of the measured RGB values with L* component values of the measured colorimetric values, and a correlation of B component values of the measured RGB values with L* component values of the measured colorimetric values). The controller further calculates, for each of K component values, a difference in each of R, G and B components between a RGB value given from the first correlations and a measured RGB value given from the second correlations, both correlated with each of lightness component values of colorimetric values (for example, a difference in each of R, G and B components between a RGB value given from the first correlations and a measured RGB value given from the second correlations, both correlated with each of L* component values of colorimetric values), by using the first correlations and the second correlations. Using the difference in each of R, G and B components calculated for each of K component values, the controller creates correction tables for R, G and B components, to be used for correcting the scanner profile. These operations allow a printer or a controller in a printing system to check and correct a deviation of a correspondence between RGB values and colorimetric values in a scanner profile, which comes from the current conditions for printing (the individual difference of scanners, print sheets and the conditions of the printer) all over the color gamut of the printer, by using a small number of patches.

As another embodiment, there are provided the following printer and correction of a scanner profile to be executed in the printer. The printer includes a print engine, an in-line scanner, an in-line color measurement device, a storage unit; and a hardware processor. First, the hardware processor causes the print engine to print the first color chart including color patches for correcting a scanner profile, and causes the in-line scanner and the in-line color measurement device to measure the color patches for correcting a scanner profile (referred to as hybrid measurement). Using measured RGB values and colorimetric values obtained by the hybrid measurement, the hardware processor of the printer creates correction tables for R, G and B components, to be used for correcting the scanner profile, as follows. In concrete terms, the hardware processor obtains from the storage unit a scanner profile created by measurement of a second color chart for creating a scanner profile beforehand. The hardware processor then obtains K component values specified for patches in the second color chart, and uses the scanner profile to calculate first correlations, for each of the K component values. The first correlation is a correlation of each of R component values, G component values and B component values of RGB values in the scanner profile with lightness component values of corresponding colorimetric values in the scanner profile. The hardware processor further obtains K component values specified for the color patches for correcting a scanner profile, and uses the measured RGB values and the measured colorimetric values of the color patches for correcting a scanner profile, to calculate second correlations, for each of the K component values. The second correlation is also a correlation of each of R component values, G component values and B component values of the measured RGB values with lightness component values of the measured colorimetric values. The hardware processor further calculates, for each of K component values, a difference in each of R, G and B components between a RGB value given from the first correlations and a measured RGB value given from the second correlations, both correlated with each of lightness component values of colorimetric values, by using the first correlations and the second correlations. Using the difference in each of R, G and B components calculated for each of K component values, the controller creates correction tables for R, G and B components, to be used for correcting the scanner profile. These operations allow a printer to correct a scanner profile during a printing process of the printer with saving time and efforts of an operator.

In a system such that the above-described printing systems are connected to a management server including a storage device storing a database including pieces of information of correction of a scanner profile (for example, a corrected scanner profile or a set of the correction tables for R, G and B components and a scanner profile to be corrected) received from the controller in each printing systems, the management server can perform the following operations. The management server can refer to the pieces of the information of correction of the scanner profile received from the controller in each printing systems, compare the plural pieces of the information prepared under the same conditions (for example, the same kind of scanners, the same kind of paper sheets and the same kind of printers), and send notice to one or more of the printing systems that sent the information based on the differences in R, G and B components such that at least one of the differences is greater than a predetermined threshold value. For example, the controller can extract, from the system, at least one printer that sent the information of correction of the scanner profile in which at least one of the differences in R, G and B components (a correction amount) is greater than a predetermined threshold value, determine the least one printer as a printer that needs attention, and send notice to the printing system including the determined printer. These operations allow a management server to send information about necessary measures (which include device maintenance like cleaning of a scanner, and adjustment for a print engine) to an appropriate printing system.

In the above and the following descriptions, a group of K-gray patches (the first group of patches) and a group of CMYK-patches (the second group of patches) are prepared as follows. The first group includes K-gray patches which are patches of colors specified in CMYK values, where the K component values specified for the patches increase from 0% at certain intervals and the C, M and Y component values specified for each of the patches are 0%. The second group includes CMYK-gray patches which are patches of colors specified in CMYK values where the K component values specified for the patches are the same as the K component values of the patches of the first group and the C, M and Y component values specified for each of the patches are almost the same and greater than 0%. The group of K-gray patches (the first group of patches) may include two K-gray patches for which a K component value of 0% and a K component value of 100% are specified, respectively.

For example, the group of K-gray patches and the group of CMYK-patches may be provided as follows, where the K, C, M and Y component values specified for each color patches are represented by α, β1, β2, and β3, respectively. The K-gray patches are multiple patches such that the values of α specified for the patches are values changing from 0% to 100%, and the values of β1, β2, and β3 specified for each of the patches are set at 0%. The CMYK-gray patches are multiple patches such that the values of α specified for the patches are values changing from 0% to 100%, which are the same as those of the K-gray parches, and the values of β1, β2, and β3 specified for each of the patches are set at almost the same values. Herein, when a difference in percentage between each of β1, β2, and β3, and βmax, which is the largest % value among β1, β2, and β3, is not greater than 20% and a chroma value C* of color made of the C, M and Y component values is not greater than 15, the values of β1, β2, and β3 are determined as being almost the same. In the CIE 1976 (L*a*b*) color space, a chroma value C* is given by the following formula (1). Further, in each of the CMYK-gray patches, at least one of β1, β2, and β3 may be 100%.

$$\text{Chroma } C^* = (a^{*2} + b^{*2})^{1/2} \quad (1)$$

In the above-described operations, the first color chart including color patches for correcting a scanner profile may be a color chart for printer calibration. In this case, the printer or controller may create a calibration table for the printer, by using colorimetric values, where the colorimetric values are calculated from measured RGB values of patches in the first color chart other than the color patches for correcting the scanner profile, by using the scanner profile and the above-described correction tables. Alternatively, the first color chart including color patches for correcting a scanner profile may be a color chart for creating a printer profile. In this case, the printer or controller may create a printer profile by using colorimetric values, where the colorimetric values are calculated from measured RGB values of patches in the first color chart other than the color patches for correcting the scanner profile, by using the scanner profile and the above-described correction tables.

EXAMPLES

Figure 2A:
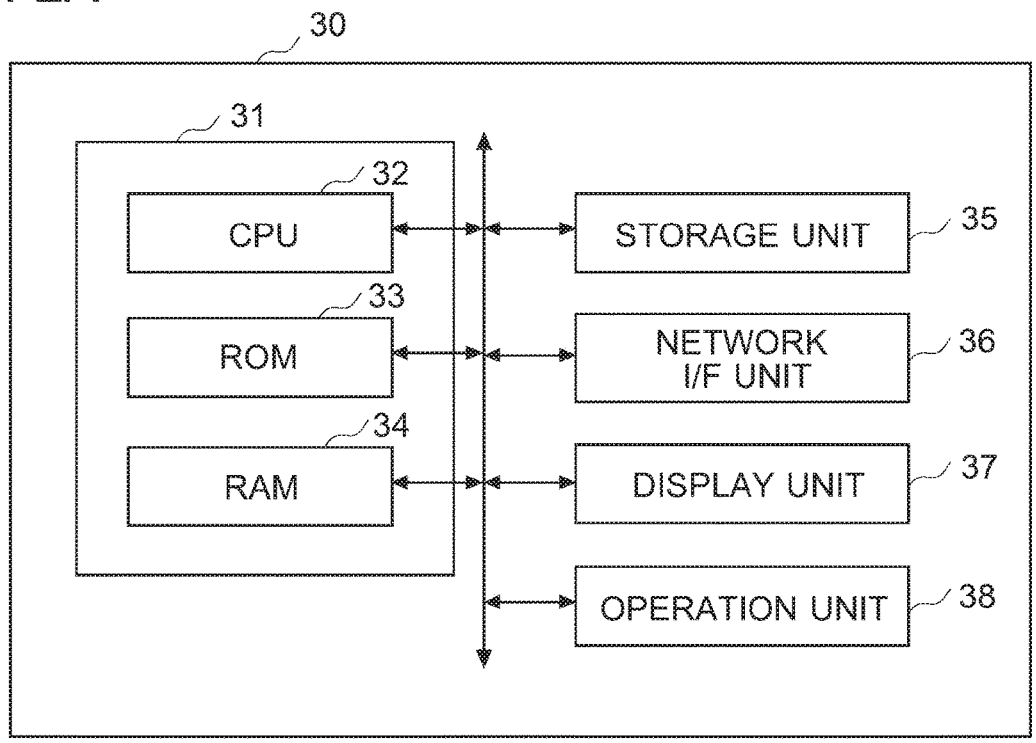
FIGS. 2A and 2B are block diagrams illustrating an example the constitution of a profile creation device according to one embodiment of the present invention.
Figure 2B:
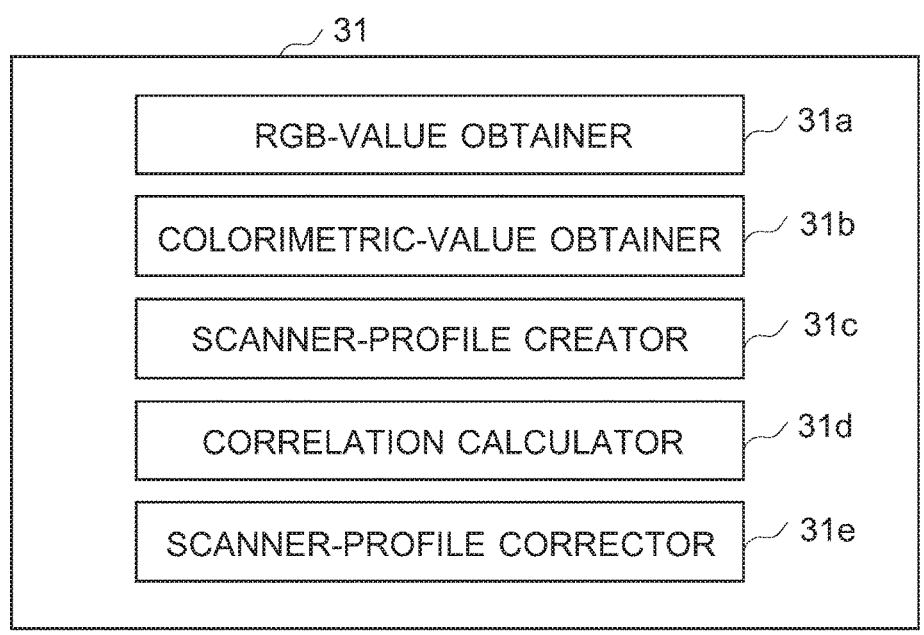
Figure 3:
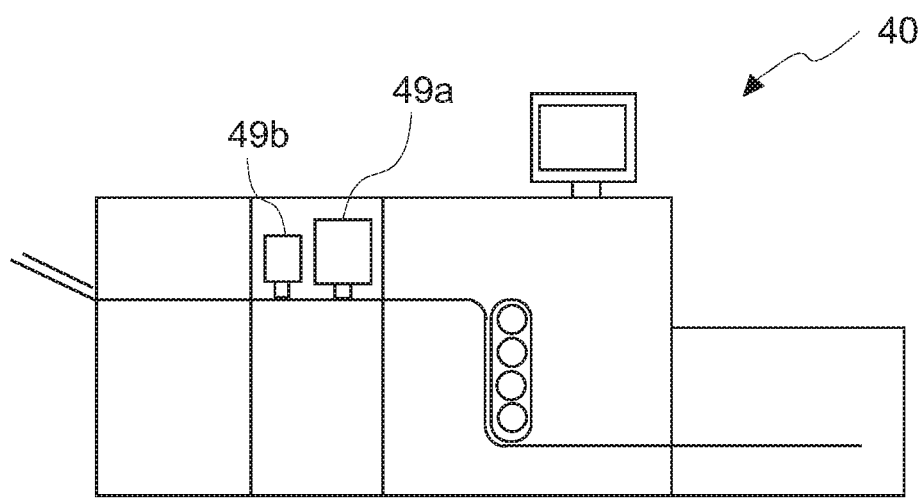
FIG. 3 is a schematic diagram illustrating an example of the constitution of a printer (which includes a scanner and a color measurement device) according to one embodiment of the present invention.
Figure 4A:
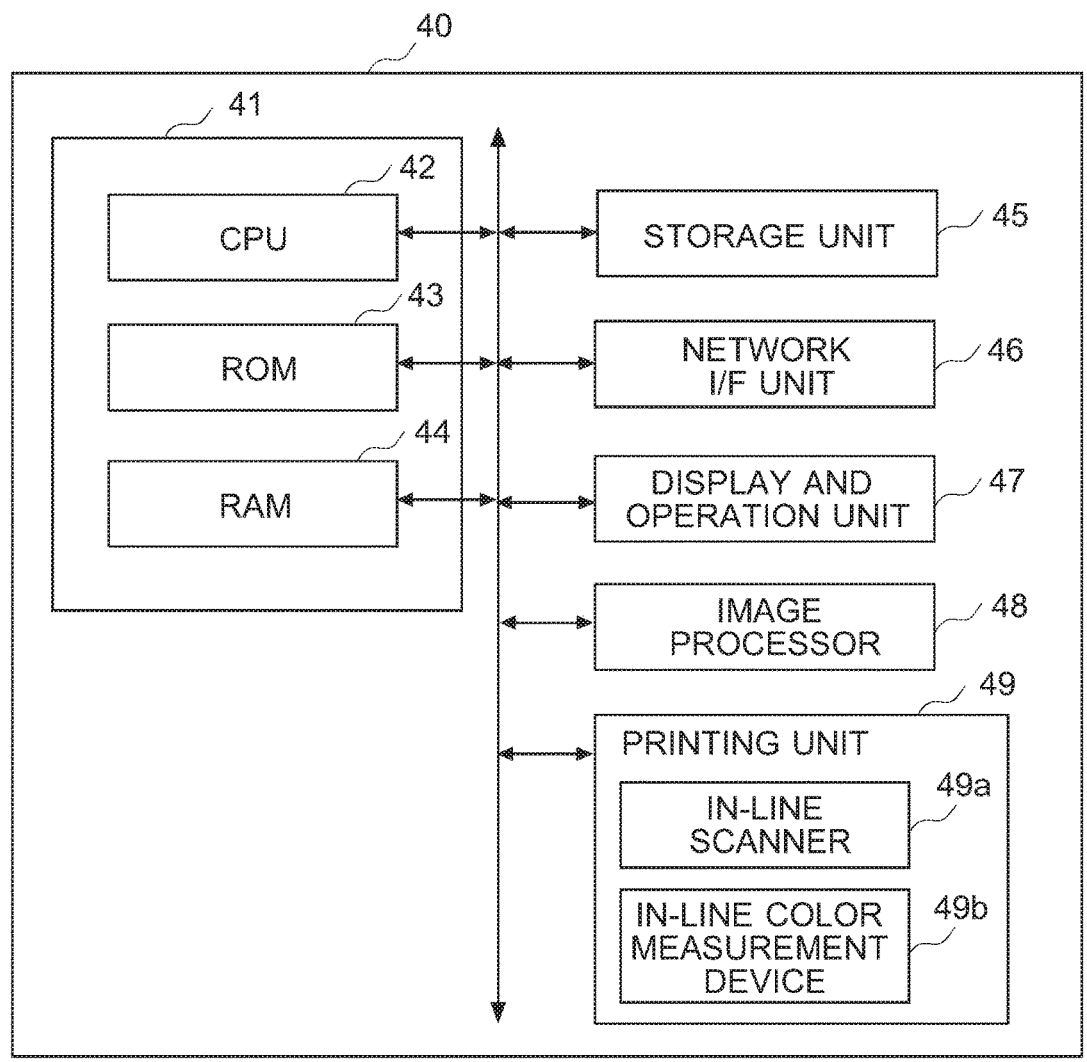
FIGS. 4A and 4B are block diagrams illustrating an example the constitution of a printer (which includes a profile creation device, a scanner, and a color measurement device) according to one embodiment of a the present invention.
Figure 4B:
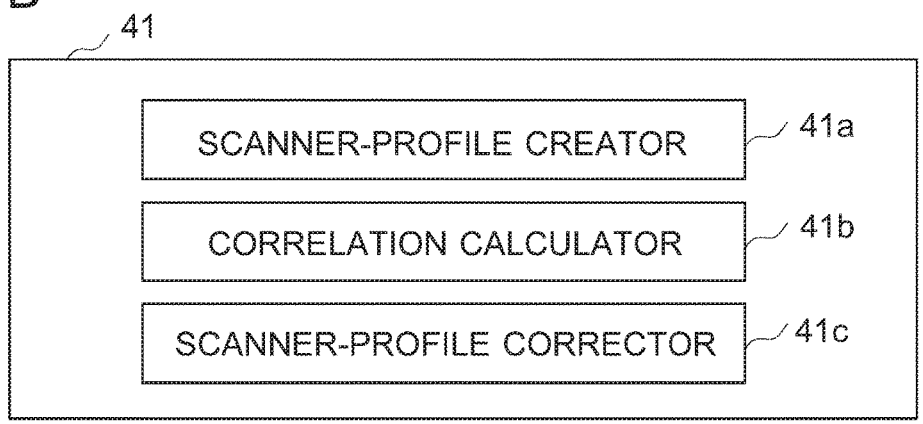
Figures 13, 14:
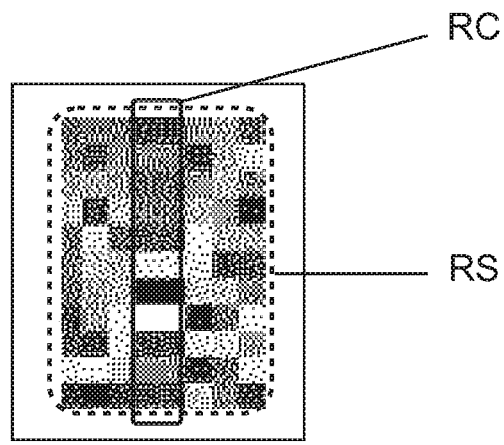
FIG. 13 is a diagram illustrating an example of a color chart including color patches for correcting a scanner profile according to one embodiment of the present invention.
FIG. 14 is a diagram for illustrating an example of color patches for correcting a scanner profile according to one embodiment of the present invention.
Figure 15A:
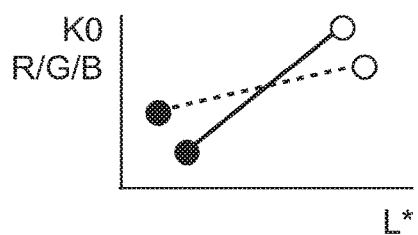
FIGS. 15A to 15F are schematic diagrams illustrating relations between each of R, G, and B component values and L* component values, for each K component value according to one embodiment of the present invention.
Figure 15B:
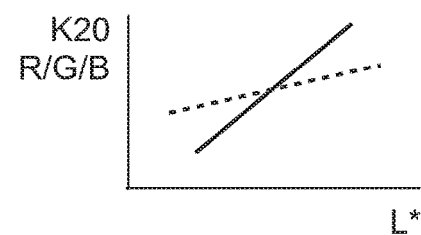
Figure 15C:
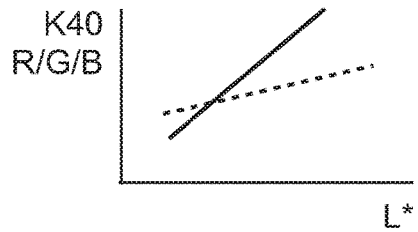
Figure 15D:
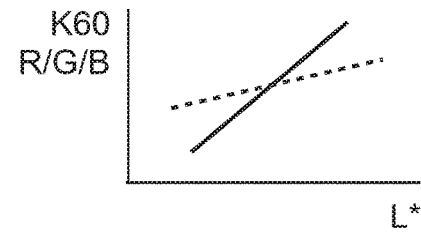
Figure 15E:
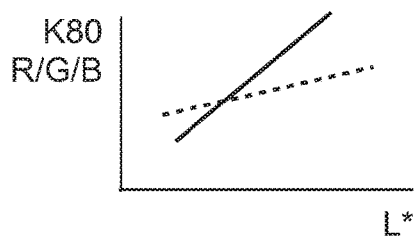
Figure 15F:
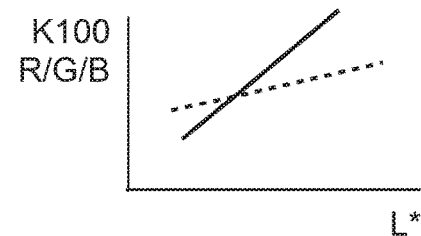
Figure 16:
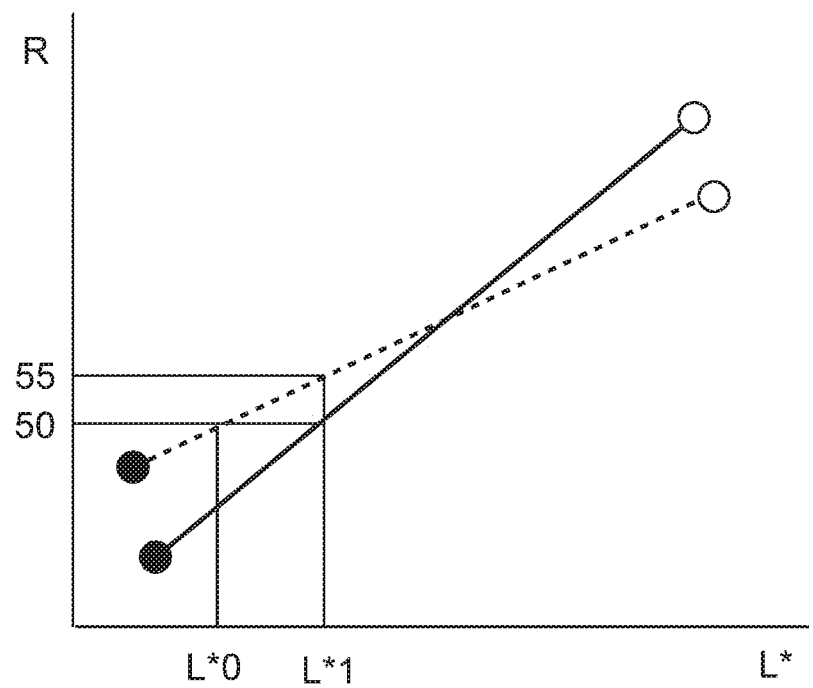
FIG. 16 is a schematic diagram for illustrating a way to correct a scanner profile according to one embodiment of the present invention.
Figure 17:
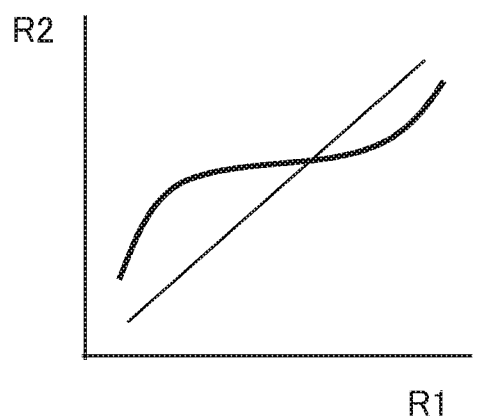
FIG. 17 is a schematic diagram for illustrating a one-dimensional correction table according to one embodiment of the present invention.
Figure 18:
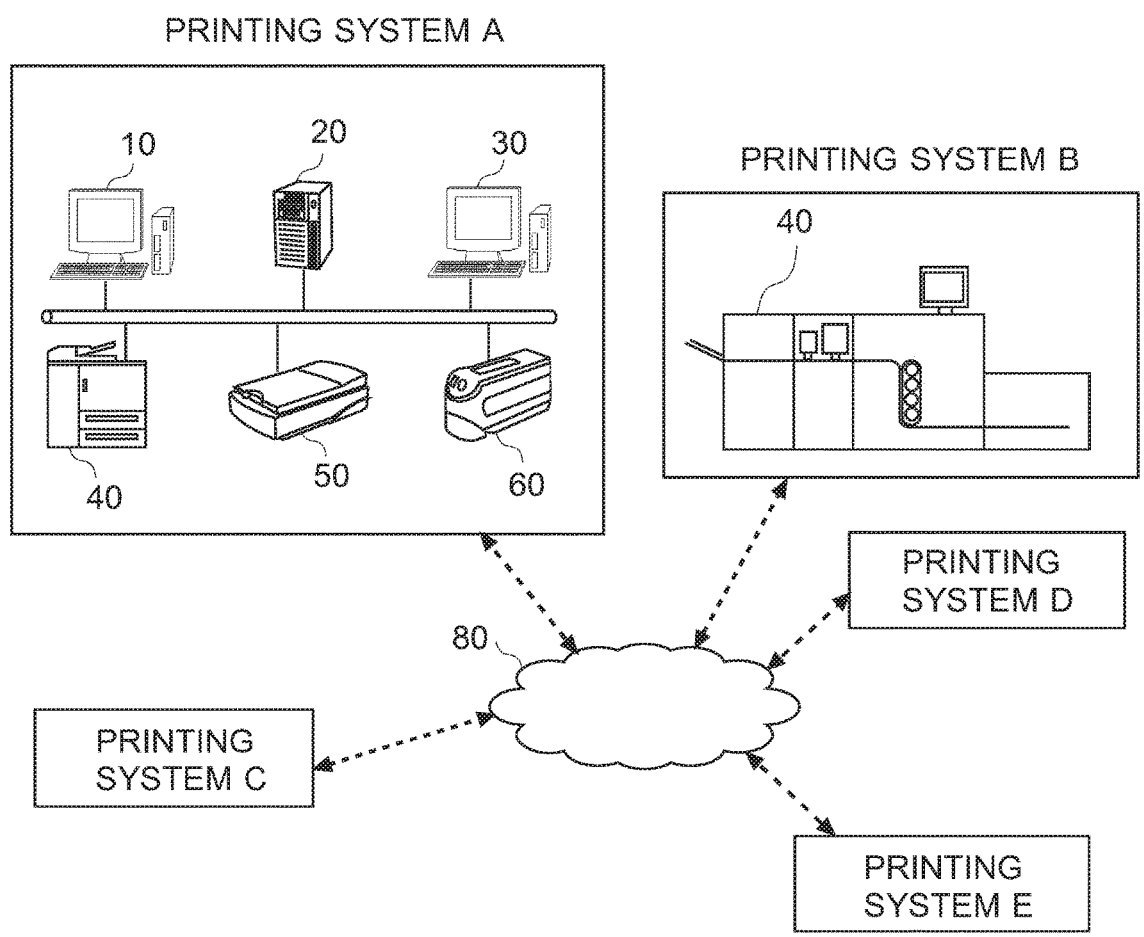
FIG. 18 is a schematic diagram illustrating an example of a cloud-based system according to one embodiment of the present invention.
Figure 19:
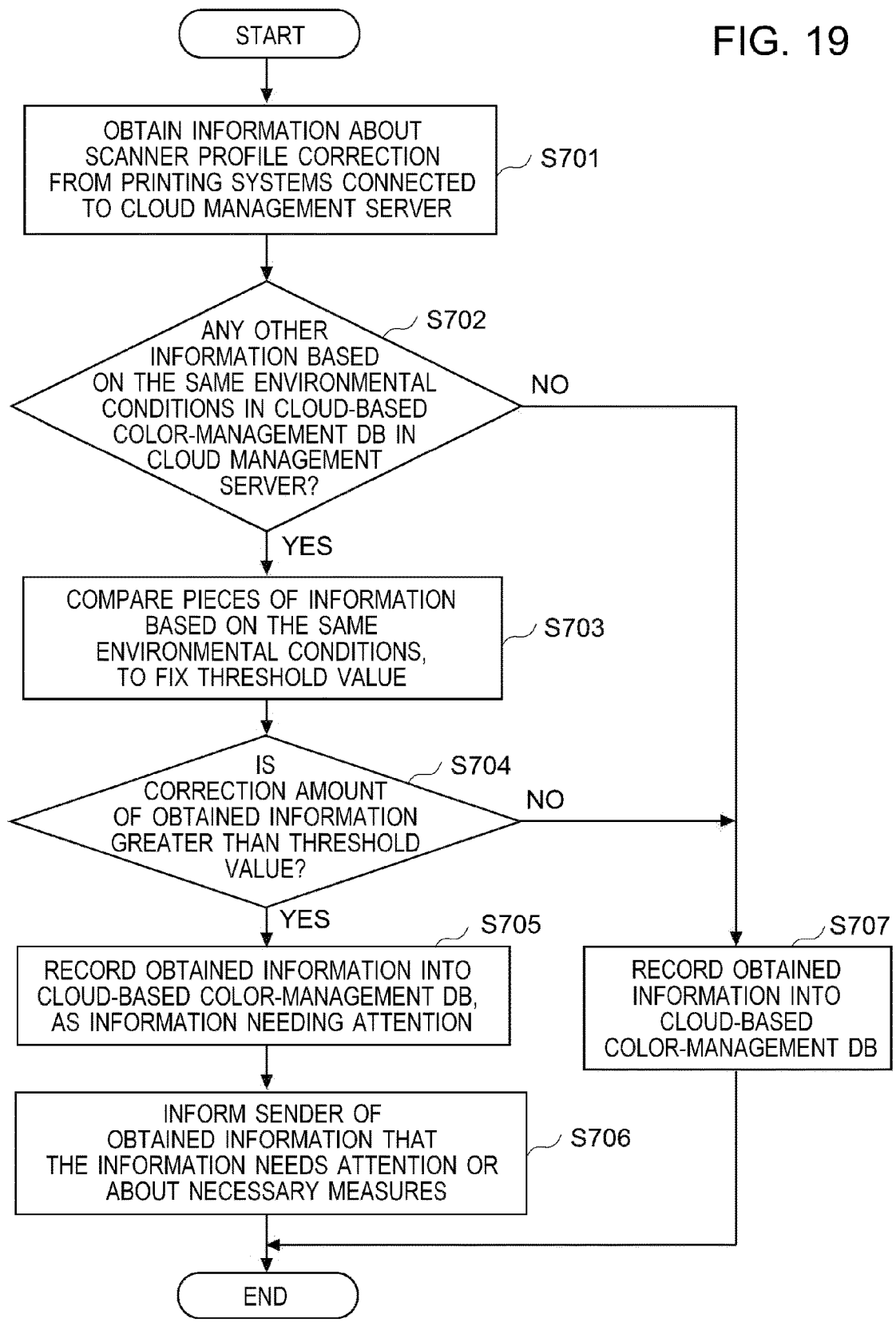
FIG. 19 is a flowchart illustrating an example of operations (registration and use of a cloud-based color management database) of a cloud management server according to one embodiment of the present invention.

In order to describe an embodiment of the present invention in more in detail, a description is given of one example of a non-transitory recording medium storing a scanner profile correcting program, a scanner profile correcting method and a printer, with reference to FIG. 1 through FIG. 19. FIG. 1 is a schematic diagram illustrating a constitution example of a printing system according to the present example. FIGS. 2A and 2B are block diagrams illustrating a constitution example of a profile creation device according to the present example. FIG. 3 is a schematic diagram illustrating a constitution example of a printer (which includes a scanner and a color measurement device) according to the present example. FIGS. 4A and 4B are block diagrams illustrating a constitution example of a printer (which includes a profile creation device, a scanner, and a color measurement device) according to the present example. Each of FIG. 5 to 10 is a flowchart illustrating operations of a printer which also serves as a profile creation device according to the present example. FIG. 11 is a diagram for illustrating the lattice points of a scanner profile. FIGS. 12A to 12 C are diagrams illustrating an example of a scanner profile (a color conversion table). FIG. 13 is a diagram illustrating an example of a color chart including color patches for correcting a scanner profile. FIG. 14 is a diagram for illustrating an example of color patches for correcting a scanner profile. FIGS. 15A to 15F are schematic diagrams illustrating relations between each of R, G, and B component values and L* component values, for each K component value. FIG. 16 is a schematic diagram for illustrating a scanner profile correcting method. FIG. 17 is a schematic diagram illustrating a one-dimensional correction table. FIG. 18 is a schematic diagram illustrating an example of a cloud-based system according to the present example. FIG. 19 is a flowchart illustrating an example of operations (a method of registration and use of a cloud-based color-management database) of a cloud server.

As illustrated in FIG. 1, a printing system according to the present example includes output instruction device 10, print controller 20, profile creation device 30, printer 40, scanner 50 and color measurement device 60. The above devices are communicatively connected to each other via a communication network 70, where examples of the communication network 70 include a LAN (Local Area Network) and WAN (Wide Area Network) defined by specifications, such as Ethernet, Token Ring and FDDI (Fiber-Distributed Data Interface). In the printing system, print controller 20 and printer 40 may be communicatively connected to each other with an exclusive line supporting, for example, PCI (Peripheral Component Interconnect) communication.

Output instruction device 10 is a computing device as a client, and is configured to issue a job (print data) to give print instructions to print controller 20 through a printer driver or a software program for exclusive use.

Print controller 20 is configured to perform image processing, which includes color conversion, rasterization and screening, on print data received from output instruction device 10, and send raster data (image data) obtained after the image processing, to printer 40. The above-described color conversion is performed by using a scanner profile or a printer profile created by profile creation device 30.

Profile creation device 30 is configured to create and/or correct a scanner profile, by using measured RGB values and measured colorimetric values (for example, L*a*b* values, XYZ values, or other color values in a device-independent color space) obtained by measurement of a color chart output by printer 40. In the present example, a scanner profile is created by using measured RGB values and measured L*a*b* values. The detailed constitution of the profile creation device 30 will be described later.

Printer 40 is configured to receive image data from print controller 20, and form images based on the image data on print sheets, to output the printed sheets. The detailed constitution of the printer 40 will be also described later.

Scanner 50 includes, for example, three kinds of sensors for RGB colors, and is configured to scan a chart printed by printer 40, to output measured RGB values as measurement results.

Color measurement device 60 is a measurement device supporting spectrophotometry (spectrophotometer or spectrocolorimeter) capable of measuring the light intensity at each wavelength. Color measurement device 60 is configured to measure colors of a color chart printed by printer 40, to output measured colorimetric values, as measurement results.

Herein, FIG. 1 illustrates a constitution example of the printing system of the present example, and its constitution can be modified appropriately. For example, the printing system may have a constitution that printer 40 includes print controller 20. Further, the printing system may have a constitution that print controller 20 or printer 40 includes profile creation device 30, or a constitution that printer 40 includes an in-line scanner and an in-line color measurement device as scanner 50 and color measurement device 60. Hereinafter, a detailed description given of profile creation device 30 and printer 40.

Profile Creation Device:

As illustrated in FIG. 2A, profile creation device 30 includes built-in controller 31, storage unit 35, network interface (I/F) unit 36, display unit 37 and operation unit 38.

Built-in controller 31 includes a CPU (Central Processing Unit) 32 as a hardware processor, and memories including ROM (Read Only Memory) 33 and RAM (Random Access Memory) 34. CPU 32 reads out control programs stored in ROM 33 or storage unit 35, loads the control programs onto RAM 34, and executes the control programs, thereby performing the whole operations of profile creation device 30.

Storage unit 35 is a non-transitory computer-readable recording medium including a HDD (Hard Disk Drive) and/or a SSD (Solid State Drive). Storage unit 35 stores programs which, when being executed, cause CPU 32 to control various sections of the profile creation device 30; information about operations and functions of the profile creation device 30; scanner profiles having been created or corrected; and other data.

Network interface unit 36 includes a NIC (Network Interface Card) and/or a modem. The network interface unit 36 connects profile creation device 30 to communication network 70 so as to be communicable with print controller 20, printer 40, scanner 50, and color measurement device 60.

Display unit 37 includes a display, for example, a LCD (Liquid Crystal Display) or an organic EL (Electro-Luminescence) display, so as to display various kinds of screens with regard to creation and correction of a scanner profile.

Operation unit 38 includes an input device, for example, a mouse, a keyboard and/or hardware switches, and allows an operator to perform various operations with regard to creation and correction of a scanner profile.

As illustrated in FIG. 2B, built-in controller unit 31 is configured to work as RGB-value obtainer 31a, colorimetric-value obtainer 31b, scanner-profile creator 31c, correlation calculator 31d and scanner-profile corrector 31e.

RGB-value obtainer 31a is configured to, in creation of a scanner profile, obtain from scanner 50 (or in-line scanner 49a of printer 40, which will be described later), measured RGB values given by measurement of patches in a chart for creating a scanner profile. RGB-value obtainer 31a is further configured to, in correcting a scanner profile, obtain from scanner 50 (or in-line scanner 49a of printer 40), measured RGB values given by measurement of patches (at least color patches for correcting a scanner profile) in a color chart including the color patches for scanner profile correction.

Colorimetric-value obtaining obtainer 31b is configured to, in creation of a scanner profile, obtain from color measurement device 60 (or in-line color measurement device 49b of printer 40, which will be described later), measured colorimetric values given by measurement of patches in a chart for creating a scanner profile. Colorimetric-value obtaining obtainer 31b is further configured to, in correcting a scanner profile, obtain from color measurement device 60 (or in-line color measurement device 49b of printer 40), measured colorimetric values given by measurement of the color patches for scanner profile correction in the color chart including the color patches for scanner profile correction.

Scanner-profile creator 31c is configured to use measured RGB values and corresponding measured colorimetric values obtained by RGB-value obtainer 31a and colorimetric-value obtainer 31b, respectively, in a process of creating a scanner profile, and create a scanner profile (color conversion table), in which the measured RGB values and the corresponding measured colorimetric values are associated with each other. Scanner-profile creator 31c is further configured to store the created scanner profile (color conversion table) into storage unit 35 or another storage device.

Correlation calculator 31d is configured to perform the following operations. Correlation calculator 31d obtains a scanner profile from storage unit 35 or another storage device to obtain K component values of patches in the color chart for creating a scanner profile. Correlation calculator 31d then uses the scanner profile to calculate, for each K component value, a correlation of each of R, G and B component values of RGB values in the scanner profile and lightness component values of the corresponding colorimetric values in the scanner profile. The calculated correlations are referred to as first correlations. In this example, the first correlations are a correlation of R component values of the RGB values and L*component values of the corresponding L*a*b* value, a correlation of G component values of the RGB values and L*component values of the corresponding L*a*b* value, and a correlation of B component values of the RGB values and L*component values of the corresponding L*a*b* value, which will be represented by R/L*, G/L* and B/L*, respectively. Correlation calculator 31d further obtains K component values of the color patches for correcting a scanner profile in the color chart, and uses the measurement values of the color patches for correcting a scanner profile to calculate, for each of the K component values, a correlation of each of R, G and B component values of the measured RGB values and lightness component values of the corresponding measured colorimetric values. The calculated correlations are referred to as second correlations. In this example, the second correlations are a correlation of R component values of the measured RGB values and L*component values of the corresponding L*a*b* value, a correlation of G component values of the measured RGB values and L*component values of the corresponding L*a*b* value, and a correlation of B component values of the measured RGB values and L*component values of the corresponding L*a*b* value, which will also be represented by R/L*, G/L* and B/L*, respectively.

Scanner-profile corrector 31e is configured to perform the following operations. Scanner-profile corrector 31e uses the first correlations (R/L*, G/L* and B/L*) for each K component value, calculated from the scanner profile, and the second correlations (R/L*, G/L* and B/L*) for each K component value, calculated from the measurement values of the color patches for correcting a scanner profile, to calculate, for each K component value, a difference in each of R, G and B component values between a RGB value given from the first correlations and a measured RGB value given from the second correlations, both correlated with the same lightness component value of each of colorimetric values (in this example, a difference in each of R, G and B component values between a RGB value given from the first correlations and a measured RGB value given from the second correlations, both correlated with each of L* component values of colorimetric values). Scanner-profile corrector 31e then uses the differences calculated for each K component value, to create a correction table for each of R, G and B component, to be used for correcting the scanner profile. Hereinafter, the correction table for each of R, G and B component are referred to as a one-dimensional correction table.

Herein, the above-mentioned RGB-value obtainer 31a, colorimetric-value obtainer 31b, scanner-profile creator 31c, correlation calculator 31d and scanner-profile corrector 31e may be constituted as hardware devices. Alternatively, the above-mentioned RGB-value obtainer 31a, colorimetric-value obtainer 31b, scanner-profile creator 31c, correlation calculator 31d and scanner-profile corrector 31e (in particular, the RGB-value obtainer 31a, colorimetric-value obtainer 31b, correlation calculator 31d and scanner-profile corrector 31e) may be provided by a scanner profile correcting program which causes built-in controller 31 to function as these sections when being executed by CPU 32. That is, built-in controller 31 may be configured to serve as the RGB-value obtainer 31a, colorimetric-value obtainer 31b, scanner-profile creator 31c, correlation calculator 31d and scanner-profile corrector 31e (in particular, the RGB-value obtainer 31a, colorimetric-value obtainer 31b, correlation calculator 31d and scanner-profile corrector 31e), when CPU 32 executes the scanner profile correcting program.

Printer:

Printer 40 is an image forming apparatus like a MFP (Multi-Functional Peripheral), and is configured to print and output various kinds of color chart including a chart for creating a scanner profile and a color chart for correcting a scanner profile. In the block diagram of FIG. 1A, the printing system includes printer 40, scanner 50 and color measurement device 60 as separated devices. Alternatively, the printing system may include printer 40 equipped with in-line scanner 49a and in-line color measurement device as illustrated in FIG. 3. Printer 40 having the constitution illustrated in FIG. 3, includes built-in controller 41, storage unit 45, network interface (I/F) unit 46, display and operation unit 47, image processor 48 and printing unit 49.

Built-in controller 41 includes CPU 42 as a hardware processor, and memories including ROM 43 and RAM 44. CPU 42 reads out control programs stored in ROM 43 or storage unit 45, loads the control programs onto RAM 44, and executes the control programs, thereby performing the whole operations of printer 40.

Storage unit 45 is a non-transitory computer-readable recording medium including a HDD and/or a SSD. Storage unit 45 stores programs which, when being executed, cause CPU 42 to control various sections of printer 40; information about processing and functions of the printer 40; scanner profiles and printer profiles; and other data.

Network interface unit 46 includes a NIC and/or a modem. Network interface unit 46 connects printer 30 to communication network 70 so as to be communicable with print controller 20 and profile creation device 30.

Display and operation unit 47 is configured to display various screens relating to printing and allow an operator to perform, on the screens, various operations relating to printing. Examples of the display and operation unit 37 include a touch screen in which a pressure-sensitive operation unit (a touch sensor) composed of lattice-shaped transparent electrodes is arranged on a display unit. In printer 40 that also serves as profile creation device 30, display and operation unit 47 is configured to display various screens including a screen with regard to creation and correction of a scanner profile and allows an operator to perform, on the screens, various operations including operations with regard to creation and correction of a scanner profile.

Printer 40 includes image processor 48, if the printer 40 serves as print controller 20. Image processor 48 is configured to perform image processing, which includes color conversion, rasterization and screening, on a job (print data) received from output instruction device 10, and send raster data (image data) obtained after the image processing, to printing unit 49.

Printing unit 49 (print engine) is configured to perform printing by using image data obtained after the image processing. In the printing unit 49, an exposure unit irradiates a photoreceptor drum, which was charged by a charging unit, with a laser beam in accordance with an image, to form latent images on the photoreceptor drum. A developing unit then develops the latent image by adhering charged toner onto the photoreceptor drum, and the developed toner image is transferred onto a transfer belt (first transfer processing), further is transferred from a transfer belt onto a sheet of paper (second transfer processing), and are fixed onto the sheet by a fixing unit. If printer 40 has functions of scanner 50 and color measurement device 60, printing unit 49 further includes in-line scanner 49a and in-line color measurement device 49b.

In-line scanner 49a includes, for example, three kinds of sensors for RGB colors, and is configured to measure the whole printing area of a color chart with the RGB sensors and output measured RGB values.

In-line color measurement device 49b is, for example, a measurement device supporting spectrophotometry (spectrophotometer or spectrocolorimeter) capable of measuring the light intensity at each wavelength. In-line color measurement device 49b is configured to measure a part of the print area of a color chart with the accuracy, similarly to an external color measurement device, and output measured colorimetric values (L*a*b* values, XYZ values, or colorimetric values in a device-independent color space).

If printer 40 also serves as profile creation device 30, built-in controller unit 41 may be configured to, as illustrated in FIG. 4B, work as scanner-profile creator 41a, correlation calculator 41b and scanner-profile corrector 41c.

Scanner-profile creator 41a is configured to use measured RGB values given by measurement of a color chart with in-line color measurement device 40b and corresponding measured colorimetric values given by measurement of the color chart with in-line color measurement device 40b in a process of creating a scanner profile, and create a scanner profile (color conversion table), in which the measured RGB values and the corresponding measured colorimetric values are associated with each other. Scanner-profile creator 41a is further configured to store the created scanner profile (color conversion table) into storage unit 45 or another storage device.

Correlation calculator 41*b* is configured to perform the following operations. As described above, correlation calculator 41*d* obtains a scanner profile from storage unit 45 or another storage device to obtain K component values of patches in the color chart for creating a scanner profile. Correlation calculator 41*b* then uses the scanner profile to calculate, for each of the K component values, a correlation of each of R, G and B component values of RGB values in the scanner profile and lightness component values of the corresponding colorimetric values in the scanner profile, which are referred to as first correlations. The calculated correlations are referred to as first correlations. In this example, the first correlations are the correlations R/L*, G/L* and B/L* for each of the K component values. Correlation calculator 41*d* further obtains K component values of the color patches for correcting a scanner profile in the color chart, and uses the measurement values of the color patches for correcting a scanner profile to calculate, for each of the K component values, a correlation of each of R, G and B component values of the measured RGB values and lightness component values of the corresponding measured colorimetric values. The calculated correlations are referred to as second correlations. In this example, the second correlations are correlations R/L*, G/L* and B/L* for each of the K component values.

Scanner-profile corrector 41*c* is configured to perform the following operations. As described above, scanner-profile corrector 41*c* uses the first correlations (R/L*, G/L* and B/L*) for each K component value, calculated from the color chart for creating the scanner profile, and the second correlations (R/L*, G/L* and B/L*) for each K component value, calculated from another color chart including the color patches for correcting the scanner profile, to calculate, for each K component value, a difference in each of R, G and B component values between a RGB value given from the first correlations and a measured RGB value given from the second correlations, both correlated with the same lightness component value of each of colorimetric values (in this example, a difference in each of R, G and B component values between a RGB value given from the first correlations and a measured RGB value given from the second correlations, both correlated with each of L* component values of colorimetric values). Scanner-profile corrector 41*c* then uses the differences calculated for each K component value, to create a one-dimensional correction table for each of R, G and B component, to be used for correcting a scanner profile.

Herein, the above-mentioned scanner-profile creator 41*a*, correlation calculator 41*b* and scanner-profile corrector 41*c* may be constituted as hardware devices. Alternatively, the scanner-profile creator 41*a*, correlation calculator 41*b* and scanner-profile corrector 41*c* (in particular, correlation calculator 41*b* and scanner-profile corrector 41*c*) may be provided by a scanner profile correcting program which causes built-in controller 41 to function as these sections when being executed by CPU 42. That is, built-in controller 41 may be configured to serve as the scanner-profile creator 41*a*, correlation calculator 41*b* and scanner-profile corrector 41*c* (in particular, correlation calculator 41*b* and scanner-profile corrector 41*c*), when CPU 42 executes the scanner profile correcting program.

It should be noted that FIG. 1 to FIG. 4B illustrate the printing system, profile creation device 30 and printer 40 of the present example for illustrative purpose only, and the constitution and control of them may be modified appropriately.

Hereinafter, a description is given of operations of the printing system of the present example. The descriptions is given under the assumption that the printing system employs printer 40 illustrated in FIGS. 4A and 4B and the printer 40 also serves as the profile creation device 30 (in other words, built-in controller 41 works as the scanner-profile creator 41*a*, correlation calculator 41*b* and scanner-profile corrector 41*c*). Alternatively, another device (for example, profile creation device 30 or a device for controlling printer 40) having the same functions as those of the scanner-profile creator 41*a*, correlation calculator 41*b* and scanner-profile corrector 41*c* in the printing system may perform the following operations.

Figure 5:
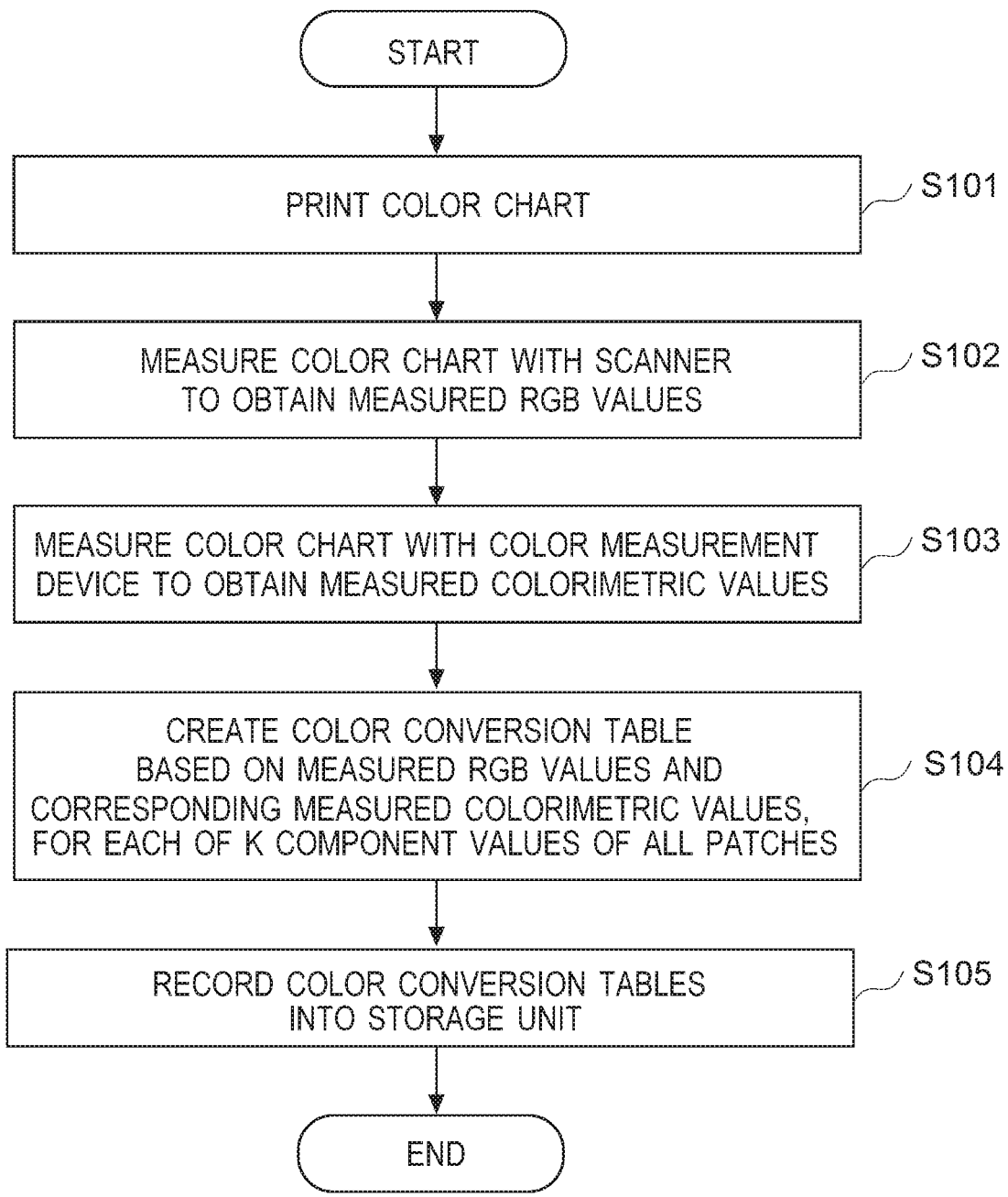
FIG. 5 is a flowchart illustrating an example of operations (creation of a scanner profile) of a printer which also serves as a profile creation device according to one embodiment of the present invention.

Creation of Scanner Profile:

First, a description is given of the steps of creating a scanner profile, with reference to a flowchart illustrated in FIG. 5. The processing of creating a scanner profile is necessary to be executed just once at the beginning of the operations of the printing system.

Printing unit 49 of printer 40 uses print sheets that meet predetermined conditions, to print a color chart including patches of colors which cover the whole color gamut of the printer (a color chart for creating a scanner profile) (Steps S101). Scanner 50 measures the color chart, and obtains measured RGB values of all the patches in the color chart (Step S102). Color measurement device 60 measures the color chart, and obtains measured colorimetric values (L*a*b* values) of all the patches in the color chart (Step S103).

Next, built-in controller 41 (scanner-profile creator 41*a*) of printer 40 obtains K component values specified for all the patches in the color chart, and creates, for each of the K component values, a scanner profile (color conversion table) in which the measured RGB values and the corresponding measured colorimetric values are associated with each other (Step S104), and records the created scanner profiles (color conversion tables) into storage unit 45 or another storage device (Step S105). FIG. 11 is a schematic diagram illustrating lattice points of the scanner profile in the R-G component plane. The lattice points are arranged at fixed intervals in the RGB color space (in this figure, the R-G component plane), and a measured colorimetric value (L*a*b* value) given by color measurement device 60 is associated with a RGB value (RG value in this figure) at each lattice point. FIGS. 12A to 12C illustrate an example of color conversion tables as a scanner profile, which are color conversion tables including the measured RGB values and the measured colorimetric values (L*a*b* values) associated with each other, for 0%, 40% and 100% K component values obtained from the color chart for creating a scanner profile, respectively.

Figure 6:
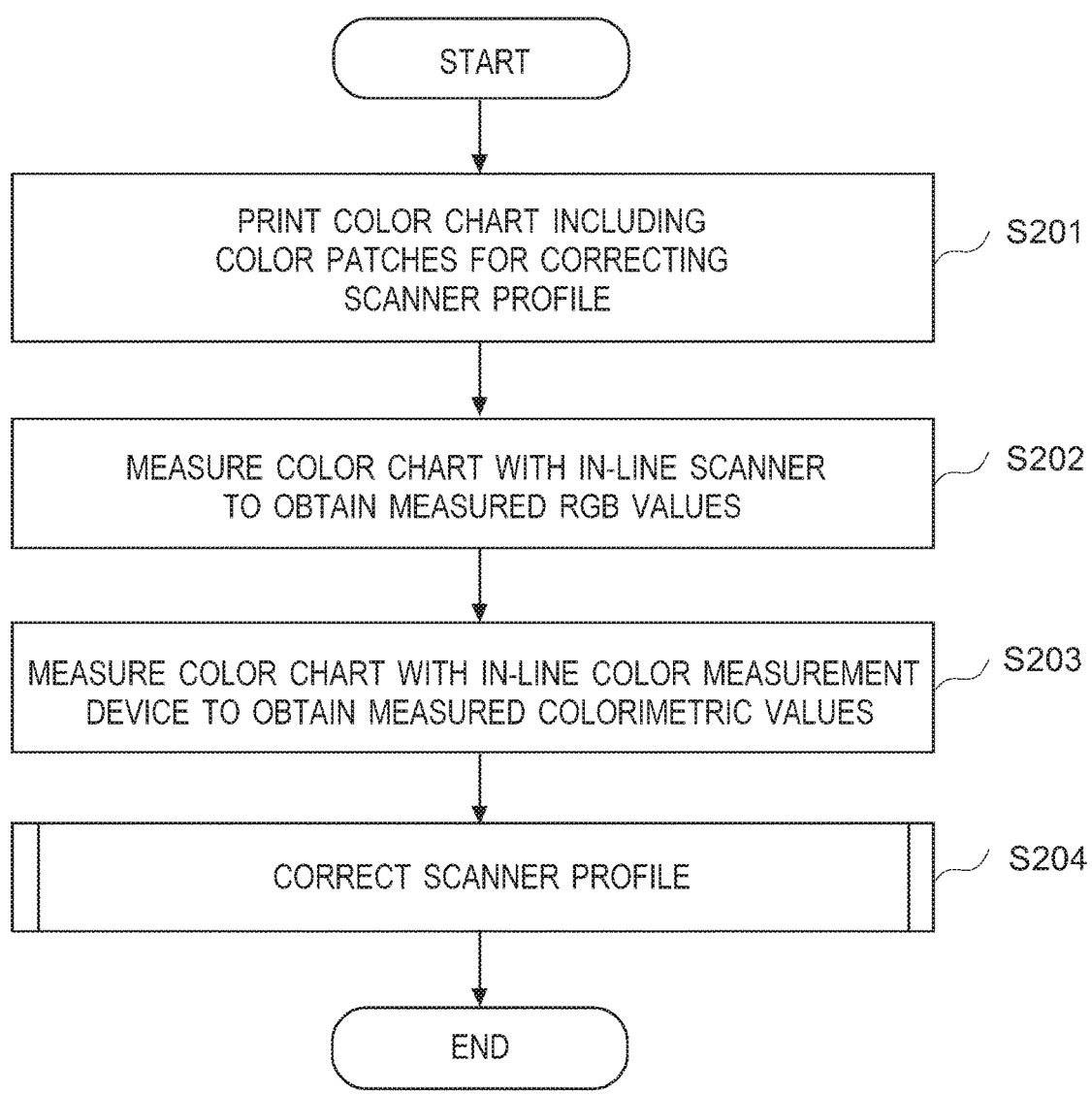
FIG. 6 is a flowchart illustrating an example of operations (correction of a scanner profile) of the printer which also serves as a profile creation device according to one embodiment of the present invention.
Figure 7:
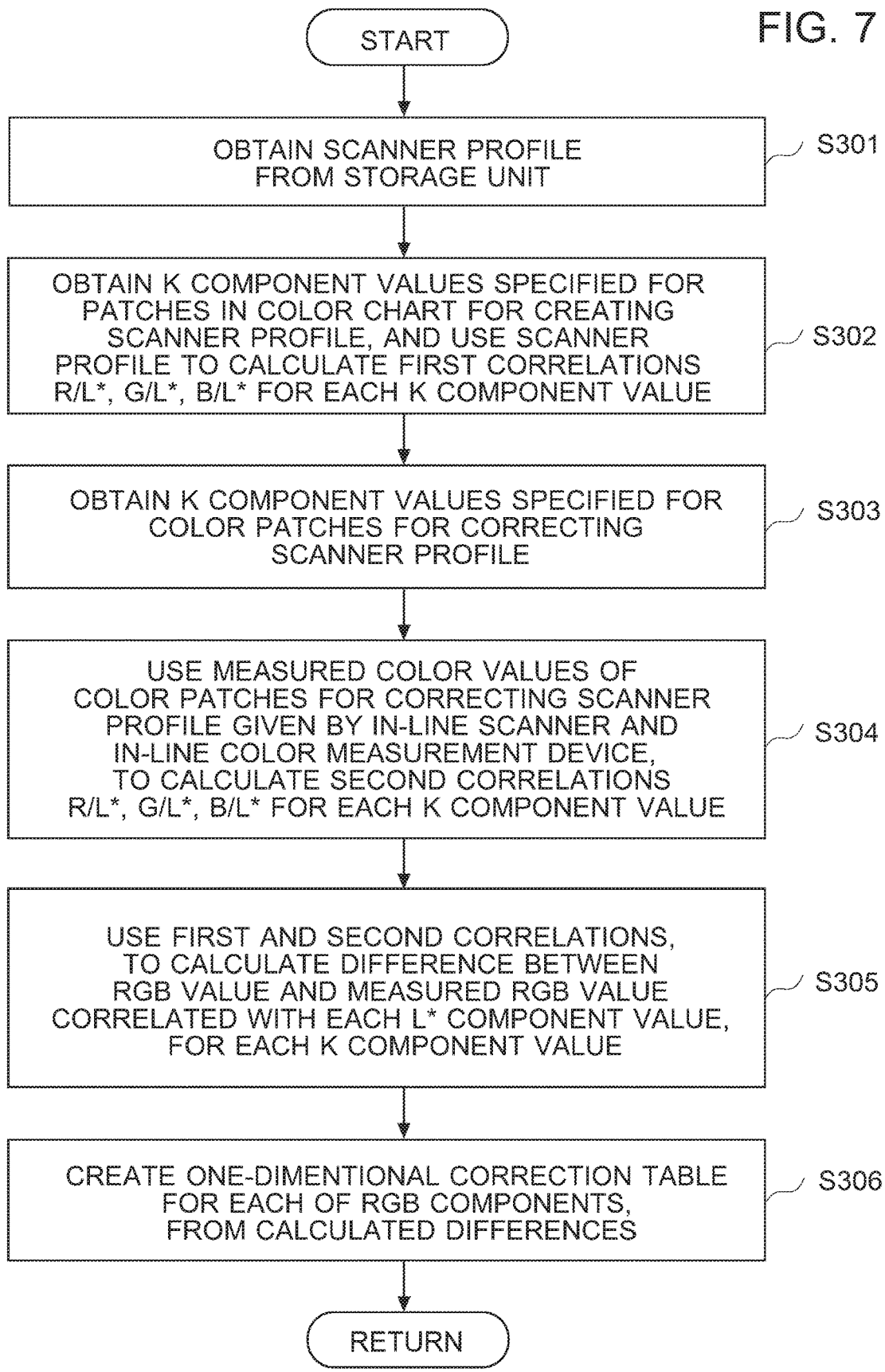
FIG. 7 is a flowchart illustrating an example of operations (details of the correction of a scanner profile) of the printer which also serves as a profile creation device according to one embodiment of the present invention.

Correction of Scanner Profile:

Next, a description is given of the steps of correcting a scanner profile, to be executed during printing operations of printer 40, with reference to the flowcharts illustrated in FIGS. 6 and 7. CPU 42 reads out a scanner profile creating program stored in ROM 43 or storage unit 45, loads the program onto RAM 44, and executes the program, thereby executing the steps of the flowcharts illustrated in FIGS. 6 and 7. The description is given under the assumption that the printing system employs printer 40 including in-line scanner 49*a* and in-line color measurement device 49 so that a scanner profile can be corrected successively during printing operations of printer 40 and time and efforts of an operator for the correction of a scanner profile can be reduced. However, the constitution of printer 40 should not be limited to the above constitution. For example, printer 40 or another device in the printing system may control external scanner 50 and external color measurement device 60 to execute the following steps.

First, printing unit 49 of printer 40 prints a color chart including color patches for correction a scanner profile on a desired sheet and outputs the printed color chart (Step S201). FIG. 13 illustrates an example of the color chart. In the figure, region RS enclosed with a broken line is a region intended to be measured by the in-line scanner 49*a*, and region RS enclosed with a solid line is a region intended to be measured by the in-line color measurement device 49*b*. That is, patches to be measured by the in-line color measurement device 49*b* are patches for hybrid measurement, in other words, patches actually measured by both the in-line scanner 49*a* and the in-line color measurement device 49*b*, and these patches are used as color patches for correcting a scanner profile. In many cases, a printing system employs in-line color measurement device 49*b* having a limited measurable area because of the price or other reasons. In view of that, the color chart in the present example includes color patches for correcting a scanner profile so that a scanner profile can be corrected with accuracy by using a small number of patches. Concretely, the present example employs, as the color patches for correcting a scanner profile, a group of K-gray patches including patches of colors in CMYK values such that K component values specified for the patches increase gradually (at certain intervals) from 0% and C, M and Y component values specified for each of the patches are 0%; and a group of CMYK-gray patches including patches of colors in CMYK values such that K component values specified for the patches are same as the K component values of the patches of the K-gray patch group and C, M and Y component values specified for each of the patches are almost the same and greater than 0%.

FIG. 14 is a table for illustrating an example of the color patches for correcting a scanner profile. At least two patches for each K component value are necessary for scanner profile correction. For example, in the case of K=40% (a 40% K component value or K40% in FIG. 14), the correction is performed by preparing and using a patch of 40% K, 0% C, 0% M and 0% Y (a K-gray patch indicated by K40-CMY0 in FIG. 14), and a patch of 40% K, 100% C, 100% M and 100% Y (a CMYK-gray-patch indicated by K40-CMY100 in FIG. 14). Also for K=0% (a 0% K component value or K0 %), K=20% (a 20% K component value or K20%), K=60% (a 60% K component value or K60%), K=80% (a 80% K component value or K80%), and K=100% (a 100% K component value or K100%), two patches are prepared similarly and used for the correction. For the color patches for correcting a scanner profile, although arbitrary K component values may be specified, it is preferable that the K component values specified for the patches include the K component values used in the color chart for creating a scanner profile. In particular, it is preferable that each of the K-gray patch group and the CMYK-gray patch group, which are the color patches for correcting a scanner profile, includes two patches for which a K component value of 0% and a K component value of 100% are specified, respectively, since different kinds of paper sheets are used in creation of a scanner profile and in an actual printing process. In the above example of the color patches, although the C, M and Y component values specified for each CMYK-gray patch are 100%, the C, M and Y component values of the CMYK-gray patches do not need to be 100%.

The C, M and Y component values may be arbitrary value as long as a sufficient amount of difference in lightness between the K-gray patches and the CMYK-gray patches can be kept. In the above example of the color patches, although the C, M and Y component values specified for each of the CMYK-gray patches are the same value, the C, M and Y component values specified for each CMYK-gray patch may be different values which are greater than 0% and almost the same. For example, the C, M and Y component values specified for each CMYK-gray patch may be defined such that a difference in percentage between the largest values and each of the other values among the C, M and Y component values is not greater than 20% and the chroma C* value of the color made of the C, M and Y component values is not greater than 15. Even if the C, M and Y component values of a patch are different, it is possible to deem the patch actually as a CMYK-gray, as far as the component values satisfy the above-described conditions. A use of patches such that at least one of the C, M and Y component values is set at 100%, for the CMYK-gray patches, allow color correction over a wider area, from high lightness to low lightness, in the color gamut of the printer. Further, a use of patches of neutral grays or colors close to neutral grays, allows accurate correction of scanner profile with respect to grays each having the chroma value close to 0. Moreover, the number of color patches for correcting a scanner profile can be determined arbitrarily in accordance with the number of patches which can be measured by the in-line color measurement device 49*b*.

Next, in-line scanner 49*a* of printer 40 measures region RS (called a scanner reading region) enclosed with a broken line in the color chart illustrated in FIG. 13, and obtains measured RGB values of all the patches in the color chart (Step S202).

Next, in-line color measurement device 49*b* of printer 40 measures region RC (called a color-measurement-device reading region) enclosed with a solid line in the color chart illustrated in FIG. 13, and obtains measured colorimetric values of patches in the color-measurement-device reading region RC (for example, patches arranged in a line at the middle of the color chart) (Step S203).

Next, built-in controller 41 (correlation calculator 41*b* and scanner-profile corrector 41*c*) of printer 40 uses the measured RGB values obtained in Step S202 and the measured colorimetric values obtained in Step S203, to correct a scanner profile (Step S204). FIG. 7 illustrates the details of this step.

First, built-in controller 41 (correlation calculator 41*b*) of printer 40 obtains the scanner profile having been created beforehand from storage unit 45 or another storage device (Step S301).

Next, built-in controller 41 (correlation calculator 41*b*) of printer 40 obtains K component values specified for patches in the color chart for creating the scanner profile, and uses the scanner profile to calculate correlations R/L*, G/L*, and B/L* for each of the K component values (Step S302). FIGS. 15A to 15F are graphs illustrating the relations between each of the R, G and B component values of RGB values and the lightness component values of the corresponding colorimetric values, for each of the K component values which increase from 0% to 100% at 20% intervals (0%, 20%, 40%, 60%, 80% and 100% K component values). In each of the graphs, the vertical axis indicates either of the R, G and B component values and the horizontal axis indicates the lightness component values. In each of the graphs, the broken line indicates the correlation between either of R, G and B component values of the RGB values and the lightness component values of the colorimetric values, calculated from the scanner profile for one of the K component values. The white circle on the broken line in FIG. 15A indicates the R, G and B component values and the lightness component value, corresponding to a patch of 0% C, 0% M and 0% Y. The black circle on the broken line in FIG. 15A indicates one of the R, G and B component values and the lightness component value, corresponding to a patch of 100% C, 100% M and 100% Y.

Next, built-in controller 41 (correlation calculator 41b) of printer 40 obtains the K component values specified for the color patches for correcting the scanner profile (Step S303), and uses the measured color values of the color patches for correcting the scanner profile (the measured RGB values given by measurement of the color patches with in-line scanner 49a and the measured colorimetric values given by measurement of the color patches with in-line color measurement device 49b) to calculate correlations R/L*, G/L*, and B/L* for each of the K component values (Step S304). In each of the graphs of FIGS. 15A to 15F, the solid line indicates the correlation between either of R, G and B component values of measured RGB values and the lightness component values of the measured colorimetric values, calculated from the measured color values of the color patches for correcting the scanner profile for one of the K component values which increase from 0% to 100% at 20% intervals. The white circle on the solid line in FIG. 15A indicates one of the R, G and B component values of the measured RGB value and the lightness component value of the measured colorimetric value, corresponding to a patch of 0% C, 0% M and 0% Y. The black circle on the solid line in FIG. 15A indicates one of the R, G and B component values of the measured RGB value and the lightness component value of the measured colorimetric value, corresponding to a patch of 100% C, 100% M and 100% Y.

Next, built-in controller 41 (scanner-profile corrector 41c) of printer 40 uses the correlations R/L*, G/L*, and B/L* calculated from the scanner profile for each of the K component values and the correlations R/L*, G/L*, and B/L* calculated from the measured color values of the color patches for correcting the scanner profile for each of the K component values, to calculates, for each K component value, a difference in each of R, G and B components between a RGB value given from the first correlations and a measured RGB value given from the second correlations, both correlated with each of L* component values of colorimetric values (Step S305). Built-in controller 41 (scanner-profile corrector 41c) then uses the differences calculated for the R, G, and B components, to create a one-dimensional correction table for each of the R, G, and B components, to be used for correcting the scanner profile (Step S306). FIG. 16 is a graph for illustrating a way to correct a scanner profile, and shows the correlations between R component values and L* component values for a 40% K component value. The solid line in the graph indicates the correlation calculated from the measured color values of patches (the color patches for correcting a scanner profile) printed on an actual paper sheet, and the broken line in the graph indicates the correlation calculated from the scanner profile created beforehand. In the graph, the white circles on the solid line and the broken line each indicates the R component value and the lightness component value, corresponding to a patch of 0% C, 0% M and 0% Y, and the black circles on the solid line and the broken line each indicates the R component value and the lightness component value, corresponding to a patch of 100% C, 100% M and 100% Y. In the correlation calculated from the measured color values of patches (the color patches for correcting a scanner profile) printed on an actual paper sheet, the R component value of 50 is correlated with the lightness component value of L*1. In the correlation calculated from the scanner profile, the R component value of 50 is correlated with the lightness component value of L*0. It shows that the colorimetric values given by measurement of a printed matter deviates from the colorimetric values given from the scanner profile. By using the fact that, for the lightness component value of L*1, the R component value is 55 in the correlation calculated from the scanner profile and the R component value is 50 in the correlation calculated from the measured color values of patches (the color patches for correcting a scanner profile), built-in controller 41 can correct the R component value of a RGB value correlated with a colorimetric value having the lightness component value L*1, by calculating the difference between the R component values given from the two kinds of correlations. That is, to correct R component values, built-in controller 41 calculates, for each K component value, a difference of the R component values between a RGB value obtained from the scanner profile and the measured RGB value both correlated with each of the lightness component values of colorimetric values, and then creates a one-dimensional correction table for converting R component values (R1) into corrected R component values (R2). Similarly for G and B component values, built-in controller 41 calculates, for each K component value, a difference of each of the G component values and the B component values between a RGB value obtained from the scanner profile and the measured RGB value both correlated with each of the lightness component values of colorimetric values, and then creates one-dimensional correction tables for the G component values and the B component values. FIG. 17 is a graph created on the basis of the one-dimensional correction table calculated from the differences of the R component values. In the graph, the thick solid curved line indicates the correlation between R1 and R2 given from the one-dimensional correction table, and the thin solid straight line indicates the relation of R1=R2.

In this way, creation of one-dimensional correction tables for the R, G and B components, to be used for scanner profile correction, can be realized. That is, built-in controller 41 calculates the first correlations R/L*, G/L*, and B/L* from a scanner profile created beforehand, for each K component value, and further calculates the second correlations R/L*, G/L*, and B/L* from the measured color values of color patches for correcting the scanner profile, for each K component value. To obtain the measured color values, a color chart including the color patches for correcting the scanner profile is printed by the printer, and the printed color chart is measured with a scanner and a color measurement device (preferably, by using hybrid measurement using an in-line scanner and an in-line color measurement device). Built-in controller 41 uses the measured color values obtained from the scanner and the color measurement device, to calculate the second correlations. By using the first correlations and the second correlations, built-in controller 41 further calculates, for each K component value, a difference in each of R, G and B components between a RGB value given from the first correlations and a measured RGB value given from the second correlations, both correlated with each of L* component values of colorimetric values, and then creates a one-dimensional correction tables for the R, G and B components, on the basis of the differences. These operations allow correction of a scanner profile with high accuracy even when the correction amounts are different according to K component values specified for patches. When the operation are executed by using a printer which can measure patches by the hybrid measurement, the operations allow corrections of a scanner profile during a printing process of the printer while saving the time and efforts of an operator for the correction of a scanner profile.

Figure 8:
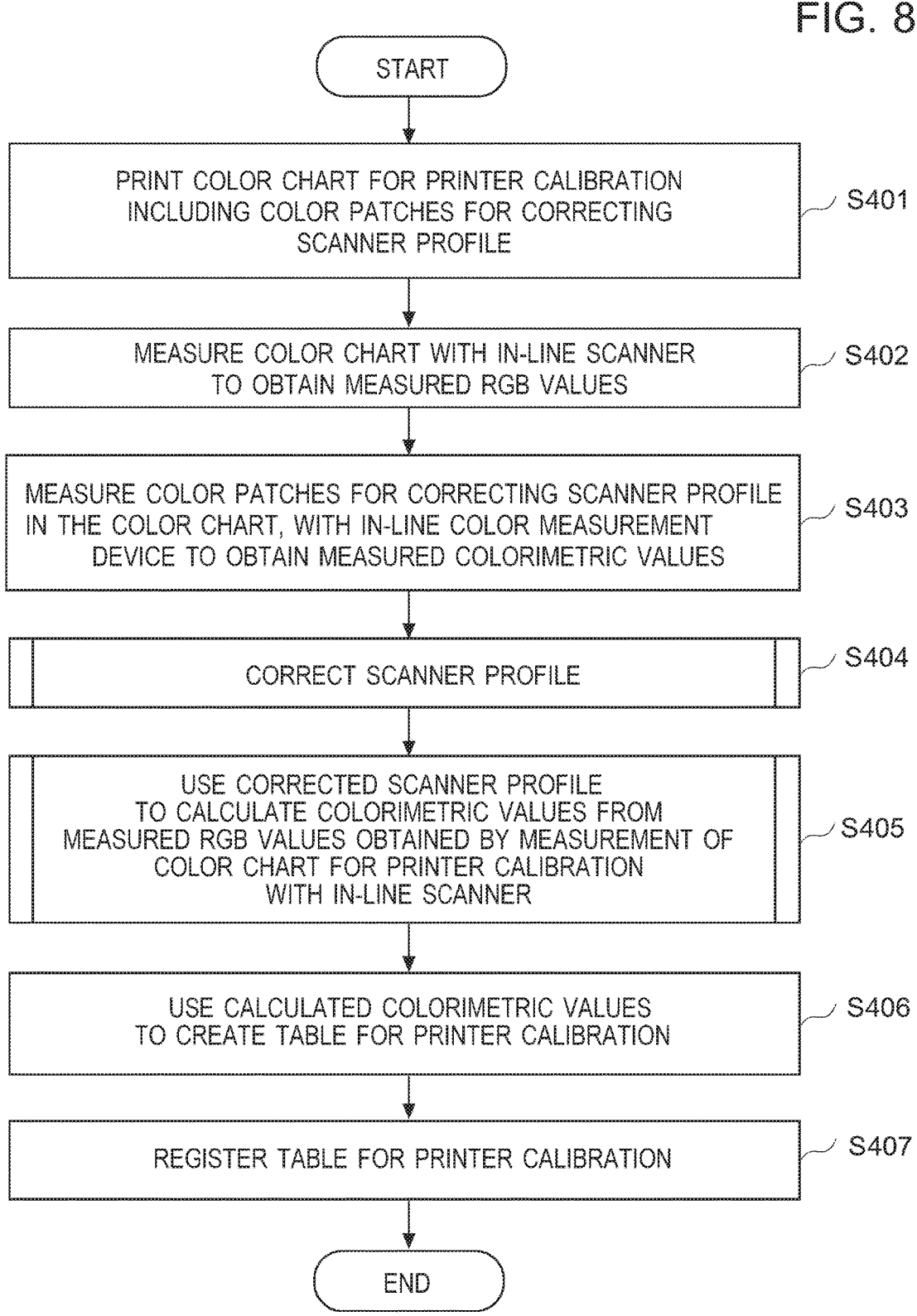
FIG. 8 is a flowchart illustrating an example of operations (first example of an use of correction tables or a corrected scanner profile) of the printer which also serves as a profile creation device according to one embodiment of the present invention.
Figure 9:
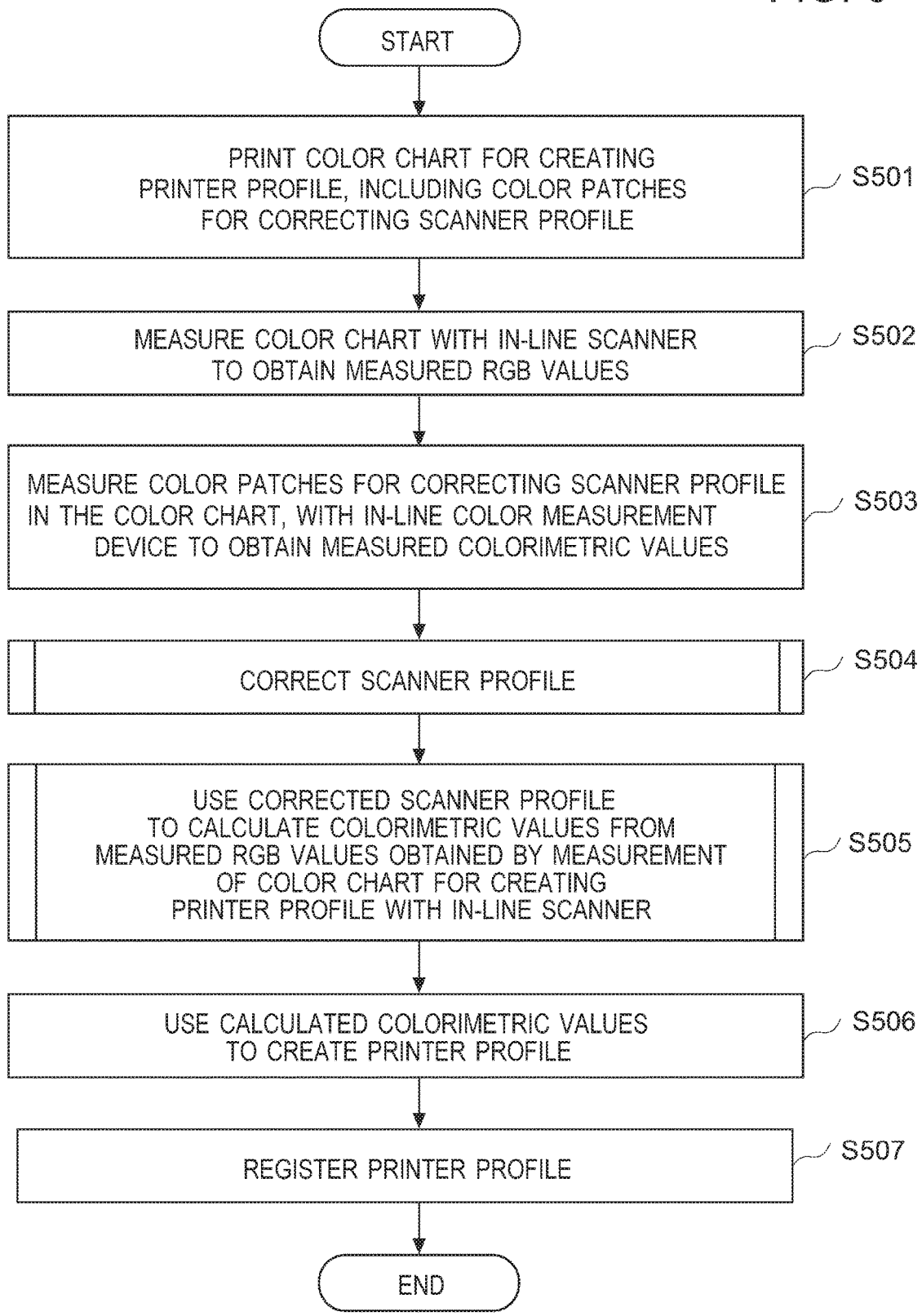
FIG. 9 is a flowchart illustrating an example of operations (second example of an use of correction tables or a corrected scanner profile) of the printer which also serves as a profile creation device according to one embodiment of the present invention.
Figure 10:
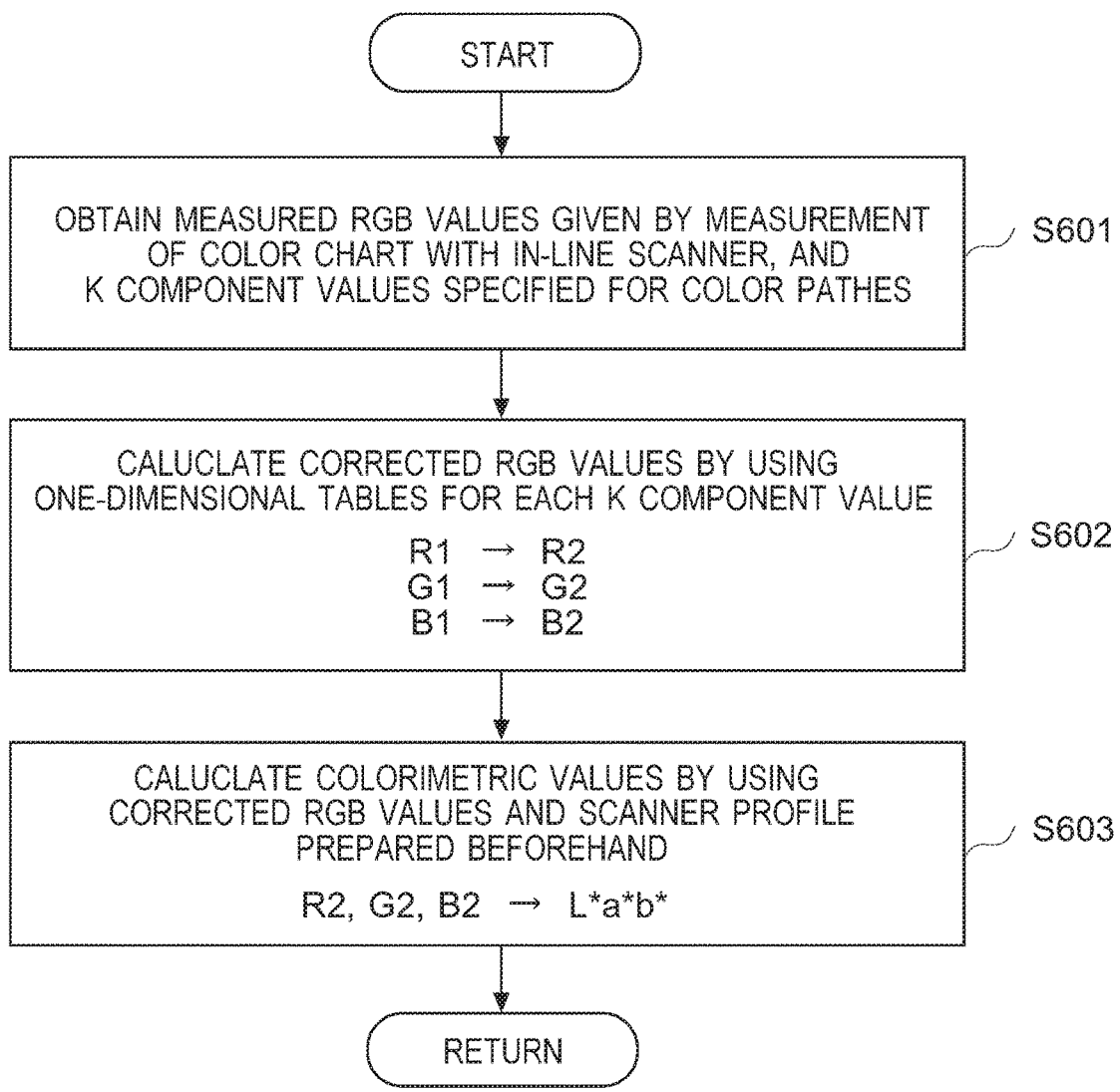
FIG. 10 is a flowchart illustrating an example of operations (details of calculation of colorimetric values) of the printer which also serves as a profile creation device according to one embodiment of the present invention.
Figure 11:
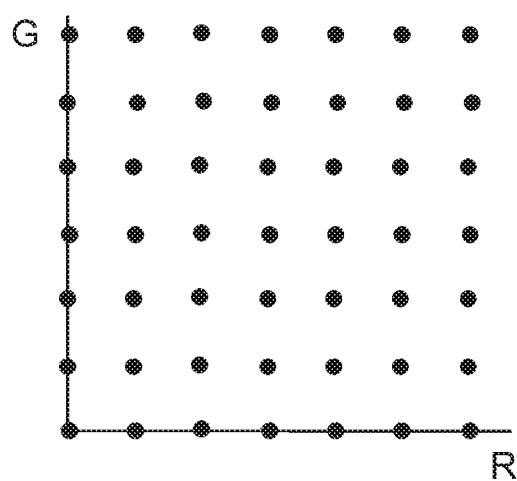
FIG. 11 is a diagram for illustrating lattice points of a scanner profile.

Next, a description is given of examples of a use of the one-dimensional correction tables for the R, G and B components or a corrected scanner profile, with reference to the flowchart of FIGS. 8 to 10. The first example is an example of a use of the one-dimensional correction tables or the corrected scanner profile in color calibration for a printer. In this example, a color chart for printer calibration is used as the color chart including the color patches for correcting a scanner profile. The second example is an example of a use of the one-dimensional correction tables or the corrected scanner profile in creation of a printer profile. In this example, a color chart for creating a printer profile is used as the color chart including the color patches for correcting a scanner profile.

First Usage Example:

In this example, built-in controller 41 of printer 40 uses a color chart for printer calibration, to create one-dimensional correction tables for the R, G and B components. Built-in controller 41 then uses the scanner profile and the one-dimensional correction tables for the R, G and B components, to correct the scanner profile. Built-in controller 41 further calculates colorimetric values from measured RGB values of patches in the color chart for printer calibration other than the color patches for correcting the scanner profile, and creates a table for printer calibration by using the calculated colorimetric values. In concrete terms, as illustrated in FIG. 8, printing unit 49 of printer 40 prints a color chart for printer calibration which includes color patches for correcting a scanner profile (Step S401). Next, in-line scanner 49a of printer 40 measures the color chart, to obtain measured RGB values of all the patches in the color chart (Step S402). In-line color measurement device 49b measures the color-measurement-device reading region RC in the color chart, to obtain measured colorimetric values of the patches (color patches for correcting a scanner profile) in the color-measurement-device reading region RC (Step S403).

Next, built-in controller 41 (correlation calculator 41b and scanner-profile corrector 41c) of printer 40 uses the measured RGB values obtained in Step S402 and the measured colorimetric values obtained in Step S403, to create the one-dimensional correction tables for the R, G and B components and correct the scanner profile (Step S404). Operations of this step is the same as those in the flowchart of FIG. 7.

Next, built-in controller 41 of printer 40 uses the corrected scanner profile (or the one-dimensional correction tables for the R, G and B components and the scanner profile prepared beforehand), to calculate colorimetric values from measured RGB values of a color chart for printer calibration (measured RGB values of patches in the color chart other than color patches for correcting a scanner profile) obtained with in-line scanner 49a (Step S405). FIG. 10 illustrates the details of these steps. First, built-in controller 41 obtains measured RGB values (R1, G1, B1) obtained by measurement of the color chart for printer calibration with in-line scanner 49a and the K component values specified for color patches in the color chart (Step S601), and calculates corrected RGB values (R2, G2, B2) from the measured RGB values (R1, G1, B1) by using the one-dimensional correction tables for the R, G and B components, for each K component value (Step S602). Built-in controller 41 then calculates colorimetric values by using the corrected RGB values and the scanner profile having been created beforehand (Step S603).

Returning to FIG. 8, built-in controller 41 of printer 40 uses the calculated colorimetric values to create a table for printer calibration (Step S406), and records and registers the table for printer calibration into storage unit 45 or another storage device (Step S407). In the case where printer 40 has a function to check the accuracy of printer calibration, printer 40 can perform the accuracy check of printer calibration in the following ways, after having registered the table for printer calibration. Similarly to the operations in the printer calibration, printing unit 49 of printer 40 prints a color chart for printer calibration including color patches for correcting a scanner profile. Next, in-line scanner 49a of printer 40 measures the color chart, to obtain measured RGB values of all the patches in the color chart, and in-line color measurement device 49b measures the color-measurement-device reading region RC in the color chart, to obtain measured colorimetric values of the patches (color patches for correcting a scanner profile) in the color-measurement-device reading region RC. Built-in controller 41 then uses the obtained RGB values and the obtained colorimetric values, to create the one-dimensional correction tables for the R, G and B components and correct the scanner profile. Built-in controller 41 uses the corrected scanner profile, to calculate colorimetric values from the measured RGB values of the color chart for printer calibration, thereby performing the accuracy check of the printer calibration.

Second Usage Example:

In this example, built-in controller 41 of printer 40 uses a color chart for creating a printer profile, to create one-dimensional correction tables for the R, G and B components. Built-in controller 41 then uses the scanner profile and the one-dimensional correction tables for the R, G and B components, to correct the scanner profile. Built-in controller 41 further calculates colorimetric values from measured RGB values of patches in the color chart for creating a printer profile other than the color patches for correcting the scanner profile, and creates a printer profile by using the calculated colorimetric values. In concrete terms, as illustrated in FIG. 9, printing unit 49 of printer 40 prints a color chart for creating a printer profile which includes color patches for correcting a scanner profile (Step S501). Next, in-line scanner 49a of printer 40 measures the color chart, to obtain measured RGB values of all the patches in the color chart (Step S502). In-line color measurement device 49b measures the color-measurement-device reading region RC in the color chart, to obtain measured colorimetric values of the patches (color patches for correcting a scanner profile) in the color-measurement-device reading region RC (Step S503).

Next, built-in controller 41 (correlation calculator 41b and scanner-profile corrector 41c) of printer 40 uses the measured RGB values obtained in Step S502 and the measured colorimetric values obtained in Step S503, to create the one-dimensional correction tables for the R, G and B components and correct the scanner profile (Step S504). Operations of this step is the same as those in the flowchart of FIG. 7.

Next, built-in controller 41 of printer 40 uses the corrected scanner profile (or the one-dimensional correction tables for the R, G and B components and the scanner profile prepared beforehand), to calculate colorimetric values from measured RGB values of a color chart for printer calibration (measured RGB values of patches in the color chart other than color patches for correcting a scanner profile) obtained with in-line scanner 49*a* (Step S505). Operations of this step is the same as those in the flowchart of FIG. 10.

Successively, built-in controller 41 of printer 40 uses the calculated colorimetric values to create a printer profile (Step S506), and records and registers the printer profile into storage unit 45 or another storage device (Step S507).

In this way, a use of a color chart for printer calibration or a color chart for creating a printer profile, which includes color patches for correcting a scanner profile, allows built-in controller 41 of printer 40 to calculate colorimetric values from the measured RGB values of the color chart for printer calibration or the color chart for a printer profile by using the one-dimensional correction tables for the R, G and B components and the scanner profile. Further, it allows built-in controller 41 of printer 40 to create a printer calibration table or a printer profile by using the calculated colorimetric values.

In the above-described steps in the flowcharts of FIG. 5 through FIG. 10, built-in controller 41 (scanner-profile creator 41*a*) of printer 40 creates a scanner profile, to record the scanner profile into storage unit 45 of printer 40; and built-in controller 41 (scanner-profile corrector 41*c*) of printer 40 creates one-dimensional correction tables for the R, G, and B color components, to be used for correcting the scanner profile, to record the corrected scanner profile (or the one-dimensional correction tables and the scanner profile) into storage unit 45 of printer 40. Alternatively, the printing system may have the constitution that the corrected scanner profile (or the one-dimensional correction tables and the scanner profile) is recorded so as to be used by another printer.

FIG. 18 illustrates a cloud-based system including a plurality of printing systems (in the example of FIG. 18, printing systems A to E) connected to a management server (called cloud management server 80). In printing system B, printer 40 is equipped with a scanner and a color measurement device. Cloud management server 80 includes a storage device in which a database (called a cloud-based color-management database) is stored, and in the cloud-based color-management database, information about correction of a scanner profile (scanner profile corrected in each printing system, or one-dimensional correction tables created in each printing system and the corresponding scanner profile) received from each printing system is memorized.

A description is given of one example of the operations of the cloud management server 80 in the above-described cloud system with reference to the flowchart illustrated in FIG. 19.

First, from one of the printing systems (in concrete terms, a computing device or a controller in the printing systems, which calculated the one-dimensional correction tables), cloud management server 80 obtains information about correction of a scanner profile (a corrected scanner profile, or one-dimensional correction tables and a corresponding scanner profile) (Step S701).

Next, cloud management server 80 checks the cloud-based color management-database, to determine whether there is any other information about correction of a scanner profile prepared under the same environmental conditions (the same kind of scanner, the same kind of paper sheets and the same kind of printer) as those of the obtained information about correction of a scanner profile, in the cloud-based color-management database (Step S702). When finding no information about correction of a scanner profile based on the same environmental conditions (NO in Step S702), cloud management server 80 records the obtained information about correction of a scanner profile as that based on new environmental conditions into the cloud-based color-management database (Step S707).

On the other hand, when finding information about correction of a scanner profile based on the same environmental conditions (YES in Step S702), cloud management server 80 compares pieces of information about correction of a scanner profile based on the same environmental conditions, and fixes a threshold value (Step S703). Then, cloud management server 80 determines whether the correction amounts given from the obtained information about correction of a scanner profile is larger than the threshold value (Step S704), where the correction amounts are the difference in each of R, G and B components between a RGB value and a measured RGB value, both correlated with each of lightness component values of colorimetric values, calculated for each K component value. When determining that the correction amounts of the obtained information about correction of a scanner profile are not greater than the threshold value (NO in Step S704), cloud management server 80 records the obtained information about correction of a scanner profile into the cloud-based color-management database (Step S707). On the other hand, when determining that at least one of the correction amounts of the obtained information about correction of a scanner profile is greater than the threshold value (YES in Step S704), cloud management server 80 records the obtained information about correction of a scanner profile as data that needs attention, in the cloud-based color-management database (Step S705). Successively, to the printing system that sent such information, cloud management server 80 sends notice and further sends information that the determined information needs attention or information about measures necessary for the printing system (Step S706). Examples of the measures include device maintenance such as cleaning of a scanner, and re-execution of adjustment of the printer for the maximum density and/or in-plane density variation.

In this way, in the cloud-based system, cloud management server 80 registers information about correction of a scanner profile obtained from each printing system, into in the cloud-based color-management database, and, when finding a printing system that sent the information about correction of a scanner profile in which at least one correction amount (at least one of differences of each of R, G and B component values, to be used for scanner profile correction) is greater than a threshold value, sends the printing system notice and information that registered information needs attention or information about measures necessary for the printing system. These operations avoid occurrence of troubles which can arise during operations of the printing system, before they occur.

It should be noted that the present invention should not be limited to the above-described examples, and the constitution and control of the system and each device can be modified suitably, unless the modification deviates from the intention of the present invention.

For example, though the above-described examples used L*a*b* values in the CIE 1976 color space as colorimetric values, the colorimetric values is not restricted specifically. Device-independent color values in an arbitrary color space, like XYZ values of the CIE 1931 color space may be used.

Moreover, although the above-described examples provided the operations of a printing system including printer 40 configured to create and correct a scanner profile, such operations may be applied to another printing system including a printer, a scanner, a color measurement device, and a controller configured to control these devices. For example, the above-described operations may be applied to a printing system in which profile creation device 30 is configured to control printer 40, scanner 50 and color measurement device 60 to create and correct a scanner profile.

Moreover, the above-described examples provided two usage examples of one-dimensional correction tables or a corrected scanner profile, including an example of operations to execute printer calibration and an example of operations to create a printer profile. Alternatively, the above-described operations may be applied to other operations, such that color verification of a printer.

The present invention is applicable to scanner profile correcting programs to create a correction table for correcting a scanner profile; non-transitory recording media each storing the scanner profile correcting program; scanner profile correcting methods; and printers equipped with an in-line scanner and an in-line color measurement device.

Although embodiments of the present invention have been described and illustrated in detail, it is clearly understood that the same is by way of illustration and example only and not limitation, the scope of the present invention should be intepreted by terms of the appended claims.

The invention claimed is:

1. A non-transitory recording medium storing a computer-readable program for correcting a scanner profile in a printing system including a printer, a scanner, a color measurement device and a storage device, the program comprising instructions which, when executed by a hardware processor, cause the hardware processor to perform operations comprising:
    obtaining measured RGB values of color patches for correcting a scanner profile in a first color chart printed by the printer, given by measurement of the color patches with the scanner, and measured colorimetric values of the color patches for correcting a scanner profile in the first color chart, given by measurement of the color patches with the color measurement device, the color patches including a first group of patches of colors in CMYK values such that K component values specified for the patches increase from 0% at certain intervals and C, M and Y component values specified for each of the patches are 0%, and a second group of patches of colors in CMYK values such that K component values specified for the patches are same as the K component values of the patches of the first group and C, M and Y component values specified for each of the patches are almost same and greater than 0%;
    calculating first correlations, including
        obtaining from the storage device a scanner profile created by measurement of a second color chart for creating a scanner profile,
        obtaining K component values specified for patches in the second color chart, and
        using the scanner profile to calculate a correlation of each of R component values, G component values and B component values of RGB values in the scanner profile with lightness component values of corresponding colorimetric values in the scanner profile, for each of the K component values;
    calculating second correlations, including
        obtaining K component values specified for the color patches for correcting a scanner profile, and
        using the measured RGB values and the measured colorimetric values of the color patches for correcting a scanner profile, to calculate a correlation of each of R component values, G component values and B component values of the measured RGB values with lightness component values of the measured colorimetric values, for each of the K component values;
    calculating, for each of K component values, a difference in each of R, G and B components between a RGB value given from the first correlations and a measured RGB value given from the second correlations, both correlated with each of lightness component values of colorimetric values, by using the first correlations and the second correlations; and
    using the difference in each of R, G and B components calculated for each of K component values, to create correction tables for R, G and B components, to be used for correcting the scanner profile.

2. The non-transitory recording medium of claim 1,
    wherein the colorimetric values are L*a*b* values, and
    in each of the calculating the first correlations and the calculating the second correlations, a correlation of the R component values with L* component values, a correlation of the G component values with L* component values, and a correlation of the B component values with L* component values are calculated for each of the K component values, and
    in the calculating the difference, a difference in each of R, G and B components between a RGB value given from the first correlations and a measured RGB value given from the second correlations, both correlated with each of L* component values of colorimetric values are calculated for each of K component values.

3. The non-transitory recording medium of claim 1,
    wherein the first group includes two patches for which a K component value of 0% and a K component value of 100% are specified, respectively.

4. The non-transitory recording medium of claim 1,
    wherein at least one of the C, M and Y component values specified for each of the patches of the second group is 100%.

5. The non-transitory recording medium of claim 1,
    wherein the C, M and Y component values specified for each of the patches of the second group are prepared such that a difference in percentage between each of a second largest value and a third largest value, and a most largest value among the C, M and Y component values is not greater than 20% and a chroma value C* of color made of the C, M and Y component values is not greater than 15.

6. The non-transitory recording medium of claim 1,
    wherein the first color chart is a color chart for printer calibration or a color chart for creating a printer profile.

7. A method of correcting a scanner profile in a printing system including a printer, a scanner, a color measurement device, a storage device and a controller for controlling the printer, the scanner and the color measurement device, the method comprising:
    printing, by the printer, a first color chart including color patches for correcting a scanner profile, the color patches including a first group of patches of colors in CMYK values such that K component values specified for the patches increase from 0% at certain intervals and C, M and Y component values specified for each of the patches are 0%, and a second group of patches of colors in CMYK values such that K component values specified for the patches are same as the K component values of the patches of the first group and C, M and Y component values specified for each of the patches are almost same and greater than 0%;

measuring, by the scanner, the color patches for correcting a scanner profile, to obtain measured RGB values of the color patches;

measuring, by the color measurement device, the color patches for correcting a scanner profile, to obtain measured colorimetric values of the color patches;

calculating, by the controller, first correlations, including
obtaining from the storage device a scanner profile created by measurement of a second color chart for creating a scanner profile,
obtaining K component values specified for patches in the second color chart, and
using the scanner profile to calculate a correlation of each of R component values, G component values and B component values of RGB values in the scanner profile with lightness component values of corresponding colorimetric values in the scanner profile, for each of the K component values;

calculating, by the controller, second correlations, including
obtaining K component values specified for the color patches for correcting a scanner profile, and
using the measured RGB values and the measured colorimetric values of the color patches for correcting a scanner profile, to calculate a correlation of each of R component values, G component values and B component values of the measured RGB values with lightness component values of the measured colorimetric values, for each of the K component values;

calculating, by the controller, for each of K component values, a difference in each of R, G and B components between a RGB value given from the first correlations and a measured RGB value given from the second correlations, both correlated with each of lightness component values of colorimetric values, by using the first correlations and the second correlations; and using, by the controller, the difference in each of R, G and B components calculated for each of K component values, to create correction tables for R, G and B components, to be used for correcting the scanner profile.

8. The method of claim 7,
wherein the colorimetric values are L*a*b* values, and
in each of the calculating the first correlations and the calculating the second correlations, a correlation of the R component values with L* component values, a correlation of the G component values with L* component values, and a correlation of the B component values with L* component values are calculated for each of the K component values, and
in the calculating the difference, a difference in each of R, G and B components between a RGB value given from the first correlations and a measured RGB value given from the second correlations, both correlated with each of L* component values of colorimetric values are calculated for each of K component values.

9. The method of claim 7,
wherein the first group includes two patches for which a K component value of 0% and a K component value of 100% are specified, respectively.

10. The method of claim 7,
wherein at least one of the C, M and Y component values specified for each of the patches of the second group is 100%.

11. The method of claim 7,
wherein the C, M and Y component values specified for each of the patches of the second group are prepared such that a difference in percentage between each of a second largest value and a third largest value, and a most largest value among the C, M and Y component values is not greater than 20% and a chroma value C* of color made of the C, M and Y component values is not greater than 15.

12. The method of claim 7,
wherein the first color chart is a color chart for printer calibration, and
the method further comprises creating a calibration table for the printer by the controller, including
using the scanner profile and the correction tables, to calculate colorimetric values from measured RGB values of patches in the first color chart other than the color patches for correcting the scanner profile, and create the calibration table by using the colorimetric values.

13. The method of claim 7,
wherein the first color chart is a color chart for creating a printer profile, and
the method further comprises creating a printer profile by the controller, including
using the scanner profile and the correction tables, to calculate colorimetric values from measured RGB values of patches in the first color chart other than the color patches for correcting the scanner profile, and create the printer profile by using the colorimetric values.

14. The method of claim 7,
wherein a plurality of the printing systems are connected to a management server including a storage device storing a database including information of correction of the scanner profile received from the controller in each of the plurality of the printing systems, and
the method further comprises
comparing, by the management server, plural pieces of the information prepared on a basis of a same kind of scanners, a same kind of paper sheets and a same kind of printers, and
sending, by the management server, notice to one or more of the plurality of the printing systems that sent the information based on the differences in R, G and B components such that at least one of the differences is greater than a predetermined threshold value.

15. A printer comprising:
a print engine;
an in-line scanner,
an in-line color measurement device;
a storage unit; and
a hardware processor that performs operations including:
causing the print engine to print a first color chart including color patches for correcting a scanner profile, the color patches including a first group of patches of colors in CMYK values such that K component values specified for the patches increase from 0% at certain intervals and C, M and Y component values specified for each of the patches are 0%, and a second group of patches of colors in CMYK values such that K component values specified for the patches are same as the K component values of the patches of the first group and C, M and Y component values specified for each of the patches are almost same and greater than 0%;

causing the in-line scanner to measure the color patches for correcting a scanner profile, to obtain measured RGB values of the color patches, causing the in-line color measurement device to measure the color patches for correcting a scanner profile, to obtain measured colorimetric values of the color patches;

calculating first correlations, including obtaining from the storage unit a scanner profile created by measurement of a second color chart for creating a scanner profile, obtaining K component values specified for patches in the second color chart, and using the scanner profile to calculate a correlation of each of R component values, G component values and B component values of RGB values in the scanner profile with lightness component values of corresponding colorimetric values in the scanner profile, for each of the K component values;

calculating second correlations, including obtaining K component values specified for the color patches for correcting a scanner profile, and using the measured RGB values and the measured colorimetric values of the color patches for correcting a scanner profile, to calculate a correlation of each of R component values, G component values and B component values of the measured RGB values with lightness component values of the measured colorimetric values, for each of the K component values;

calculating, for each of K component values, a difference in each of R, G and B components between a RGB value given from the first correlations and a measured RGB value given from the second correlations, both correlated with each of lightness component values of colorimetric values, by using the first correlations and the second correlations; and using the difference in each of R, G and B components calculated for each of K component values, to create correction tables for R, G and B components, to be used for correcting the scanner profile.

16. The printer of claim 15, wherein the colorimetric values are L*a*b* values, and in each of the calculating the first correlations and the calculating the second correlations, a correlation of the R component values with L* component values, a correlation of the G component values with L* component values, and a correlation of the B component values with L* component values are calculated for each of the K component values, and in the calculating the difference, a difference in each of R, G and B components between a RGB value given from the first correlations and a measured RGB value given from the second correlations, both correlated with each of L* component values of colorimetric values are calculated for each of K component values.

17. The printer of claim 15, wherein the first group includes two patches for which a K component value of 0% and a K component value of 100% are specified, respectively.

18. The printer of claim 15, wherein at least one of the C, M and Y component values specified for each of the patches of the second group is 100%.

19. The printer of claim 15, wherein the C, M and Y component values specified for each of the patches of the second group are prepared such that a difference in percentage between each of a second largest value and a third largest value, and a most largest value among the C, M and Y component values is not greater than 20% and a chroma value C* of color made of the C, M and Y component values is not greater than 15.

20. The printer of claim 15, wherein the first color chart is a color chart for printer calibration, and the operations further include creating a calibration table for the printer, including using the scanner profile and the correction tables, to calculate colorimetric values from measured RGB values of patches in the first color chart other than the color patches for correcting the scanner profile, and create the calibration table by using the colorimetric values.

21. The printer of claim 15, wherein the first color chart is a color chart for creating a printer profile, and the operations further include creating a printer profile, including using the scanner profile and the correction tables, to calculate colorimetric values from measured RGB values of patches in the first color chart other than the color patches for correcting the scanner profile, and create the printer profile by using the colorimetric values.

* * * * *